(12) United States Patent
Yoshioka et al.

(10) Patent No.: US 7,071,973 B1
(45) Date of Patent: Jul. 4, 2006

(54) DIGITAL CAMERA HAVING MULTIPLE IMAGE TAKING MODES

(75) Inventors: Daigo Yoshioka, Toyonaka (JP); Masahito Niikawa, Sakai (JP)

(73) Assignee: Minolta Co., Ltd., Osaka (JP)

( * ) Notice: Subject to any disclaimer, the term of this patent is extended or adjusted under 35 U.S.C. 154(b) by 694 days.

(21) Appl. No.: 09/669,118

(22) Filed: Sep. 25, 2000

(30) Foreign Application Priority Data

Sep. 29, 1999 (JP) .................................. 11-276621

(51) Int. Cl.
 *H04N 5/225* (2006.01)
(52) U.S. Cl. .................... 348/219.1; 348/341; 396/354
(58) Field of Classification Search ........... 348/339.09, 348/207, 220.1, 208.8, 208.11, 335, 337, 348/341, 357, 368, 351, 360, 222.1, 373, 348/116, 333.06, 118, 148, 219.1; 396/354
See application file for complete search history.

(56) References Cited

U.S. PATENT DOCUMENTS

| 4,553,170 A | * | 11/1985 | Aoki et al. ................... 348/341 |
| 4,692,815 A | * | 9/1987 | Kawahara et al. ........... 348/341 |
| 5,294,990 A | | 3/1994 | Aoki ............................ 348/363 |
| 5,764,285 A | * | 6/1998 | Ochi et al. ................. 348/222.1 |
| 5,867,741 A | * | 2/1999 | Maruyama et al. .......... 396/187 |
| 5,920,347 A | * | 7/1999 | Aoki ............................ 348/341 |
| 5,946,028 A | * | 8/1999 | Ishikawa ..................... 348/335 |
| 6,128,144 A | * | 10/2000 | Togino ........................ 359/728 |
| 6,327,085 B1 | * | 12/2001 | Osawa et al. ................ 348/342 |
| 6,421,506 B1 | * | 7/2002 | Maruyama ................... 396/303 |

FOREIGN PATENT DOCUMENTS

| JP | 60-170379 A | 9/1985 |
| JP | 3-55978 A | 3/1991 |
| JP | 10-055023 A | 2/1998 |
| JP | 11-103404 A | 4/1999 |

* cited by examiner

*Primary Examiner*—David Ometz
*Assistant Examiner*—Gevell Selby
(74) *Attorney, Agent, or Firm*—Sidley Austin LLP

(57) ABSTRACT

A rotatable semitransparent mirror is arranged at an inclination above the optical path from the taking lens to the image sensing element, and the light reflected by the semitransparent mirror is directed to an optical finder provided above the mirror. The image sensed by the image sensing element is displayed on a liquid crystal display. The variation in the optical path from the taking lens to the image sensing element depending on whether or not the semitransparent mirror is set on the optical path is corrected by changing the position of the image sensing element or the taking lens, such that the impingement state of the light on the image sensing element or the optical path length from the taking lens to the image sensing element is normally rendered fixed. Both the image provided by the optical finder and the image displayed by the liquid crystal display accurately represent the image forming state on the image sensing element regardless of whether or not the semitransparent mirror is set on the optical path.

20 Claims, 13 Drawing Sheets

DIGITAL CAMERA HAVING MULTIPLE IMAGE TAKING MODES

This application is based on Patent Application No. HEI 11-276621 filed in Japan, the content of which is hereby incorporated by reference.

BACKGROUND OF THE INVENTION

1. Field of the Invention

The present invention relates to a digital camera, and specifically relates to a digital camera provided with an optical finder.

2. Description of the Related Art

In general, digital cameras are provided with a display device such as a liquid crystal display device or the like, the display device is used to display regenerated or reproduced images photographed and recorded, and display images during photography. The user can set the composition and confirm the focus state while viewing the displayed image during photography, and the display device functions as a video finder. When the display device is used as a finder, the power consumption of the battery comprising the power source of the digital camera is accelerated due to the large power consumption of the display device, thereby reducing the time photography is possible.

Digital cameras are provided with an optical finder to avoid these disadvantages. Digital cameras provided with an optical finder include the separate type wherein light is directed to a finder without mediation of the taking lens, and the single lens reflex (SLR) type wherein light passing through the taking lens is reflected and directed to the finder. In the separate type, a parallax is generated between the finder and the taking lens, whereas essentially no parallax is generated in the SLR type.

The SLR type digital camera is provided with a mirror for reflecting light transmitted through a taking lens and disposed on the optical path from the taking lens to the image sensing element, and a prism for directing the reflected light to the eye of a user and forming the viewed image as an erect image. This mirror may be a semitransparent mirror, which reflects part of the light from the taking lens and directs it to a finder, and transmits the remainder of the light directing it to the image sensing element. In this construction, the optical finder and the video finder can be used simultaneously. However, when using a semitransparent mirror, the light directed to the image sensing element is only part of the light normally transmitted through the taking lens, such that excellent images cannot be obtained in a dark photographic environment.

In cameras of the SLR type using photosensitive silver halide film, it is well known that the entire reflective mirror is conventionally arranged so as to be inclined on the optical path from the taking lens to the film, and the mirror is retracted from the optical path by rotation. The mirror is disposed on the optical path directly before exposure of the film by photography, and the light directed to the prism is reflected, the mirror is retracted while the photograph is taken, light is directed to the film, and the mirror is controllably returned onto the optical path directly after photography. The mirror in this method is called a quick return mirror.

Japanese Patent Laid-Open Publication No. HEI 10-55023(Unexamined) discloses a digital camera provided with a rotatable semitransparent mirror. The semitransparent mirror of this digital camera differs in purpose and operation from a conventional semitransparent mirror. This semitransparent mirror is integrated with a spatial low pass filter to reduce the high frequency component and an infrared cutting filter to eliminate light in the infrared range, such that when an image is sensed for recording, the mirror is not retracted from the optical path, but is disposed on the optical path perpendicular to the optical axis of the taking lens. Accordingly, the light directed to the image sensing element is only part of the light normally transmitted through the taking lens, and the concern of reducing the quality of the photographic image due to insufficient light during photography is not resolved.

Furthermore, when the semitransparent mirror is arranged so as to be inclined relative to the optical path, i.e., when an optical finder can be used, the image sensing element is used as a focus detector for autofocusing, and the image sensed by the image sensing element cannot be used as a video finder.

SUMMARY OF THE INVENTION

An object of the present invention is to eliminate the previously described disadvantages by providing a digital camera having a versatile finder.

These objects are attained in one aspect of the present invention of a digital camera comprising an image sensing element disposed at a position at which is formed an image by a taking lens; a recording unit for recording on a recording medium an image sensed by the image sensing element in accordance with recording instructions from outside the recording unit; a semitransparent mirror which rotates about an axis in a direction perpendicular to the optical axis of the taking lens so as to move between an advanced position intersecting at an inclination the optical path from the taking lens to the image sensing element, and a retracted position removed from the optical path from the taking lens to the image sensing element; and an optical finder providing an image by directing the light reflected by the semitransparent mirror set at the advanced position from the taking lens to the eye of an user.

The semitransparent mirror is a quick return mirror. The image sensing element receives light for photography from the taking lens whether the semitransparent mirror is set at the advanced position or retracted position. Accordingly, an image can be sensed and recorded or displayed regardless of the position of the semitransparent mirror. When the semitransparent mirror is set at the advanced position, the optical finder can also be used. When the mirror is set at the retracted position, all of the light from the taking lens is directed to the image sensing element, such that there is no insufficiency of light in the sensed image at this time.

The image sensing element is movable between a first position and a second position. The first position and the second position are set so as to attain equivalency of the light entering the first position directly when the semitransparent mirror is set at the retracted position, and the light entering the second position through the semitransparent mirror when the semitransparent mirror is set at the advanced position.

Although there is a difference in the optical path from the taking lens to the image sensing element depending on whether the semitransparent mirror is set at the advanced position or the retracted position, the image provided by the optical finder can match the image sensed by the image sensing element by changing the position of the image sensing element in accordance with the position of the semitransparent mirror. In this way there is greater freedom in selecting the position of the semitransparent mirror without requiring a fixed 1-to-1 correspondence of the positions of the semitransparent mirror whether or not the sensed image is used, i.e., whether or not recording or displaying.

The taking lens is movable between a first position and a second position in a direction along the optical path. The first position and the second position are set so as to equalize the optical path length from the first position directly to the image sensing element when the semitransparent mirror is set at the retracted position, and the optical path length from the second position through the semitransparent mirror to the image sensing element when the semitransparent mirror is set at the advanced position.

The difference in the optical path length depending on the position of the semitransparent mirror is eliminated by changing the position of the taking lens in accordance with the position of the semitransparent mirror, such that the image provided by the optical finder can match the image sensed by the image sensing element. In this way there is greater freedom of selection of the position of the semitransparent mirror similar to a construction moving the image sensing element.

This digital camera has a first photographic mode wherein the semitransparent mirror is set at the advanced position until recording is instructed, and set at the retracted position when recording has been instructed, and returns to the advanced position again when the image sensing element completes the sensing of the image, and a second photographic mode wherein the semitransparent mirror is set at the advanced position regardless of whether or not there is recording is instructed, and switches between the first photographic mode and the second photographic mode in accordance with switching instructions from the outside. Since the semitransparent mirror does not rotate in the second photographic mode, no vibration is generated.

Another aspect of the present invention is a digital camera comprising an image sensing element disposed at a position at which is formed an image by a taking lens; a display unit for displaying an image sensed by the image sensing element; a recording unit for recording on a recording medium an image sensed by the image sensing element in accordance with recording instructions from outside the recording unit; a semitransparent mirror which rotates about an axis in a direction perpendicular to the optical axis of the taking lens so as to move between an advanced position intersecting at an inclination the optical path from the taking lens to the image sensing element, and a retracted position removed from the optical path from the taking lens to the image sensing element; and an optical finder providing an image by directing the light reflected by the semitransparent mirror set at the advanced position from the taking lens to the eye of an user; this digital camera having a first photographic mode wherein the semitransparent mirror is set at the advanced position until recording is instructed, and set at the retracted position when recording has been instructed, and a second photographic mode wherein the semitransparent mirror is set at the retracted position regardless of whether or not the recording is instructed, and switches between the first photographic mode and the second photographic mode in accordance with switching instructions from the outside.

In the first photographic mode the display unit used as a finder and the optical finder are usable simultaneously, and in the second photographic mode the only the display unit is usable. The optical finder image advantageously does not blur even when the photographic object moves quickly, and the image displayed on the display unit advantageously expresses the true color balance of the recorded image. Both these advantages occur in the first photographic mode, and since the semitransparent mirror does not rotate in the second photographic mode, no vibration is generated.

In this digital camera also, the difference in the optical path depending on the position of the semitransparent mirror can be eliminated by changing the position of the image sensing element or the taking lens in accordance with the position of the semitransparent mirror so as to set the image sensing element or the taking lens at two positions as they are movable.

Yet another aspect of the present invention is a digital camera comprising an image sensing element disposed at a position at which is formed an image by a taking lens; and an optical element movable between an advanced position intersecting at an inclination the optical path from the taking lens to the image sensing element, and a retracted position removed from the optical path from the taking lens to the image sensing element; this digital camera having a first photographic mode wherein the optical element is set at an advanced position for photography, and a second photographic mode wherein the optical element is set at a retracted position for photography, and the optical path lengths from the taking lens to the image sensing element are equalized in the first photographic mode and the second photographic mode by moving the taking lens in a direction along the optical axis of the taking lens.

The optical element is a single element or a compound element for photography such as a semitransparent mirror, infrared cutting filter, spatial modulation element, ND filter or the like. Furthermore, the optical element may be set at an advanced position or a retracted position by rotation, or may be set at both positions by movement other than rotation.

Still another aspect of the present invention is a digital camera comprising an image sensing element disposed at a position at which is formed an image by a taking lens; and an optical element movable between an advanced position intersecting at an inclination the optical path from the taking lens to the image sensing element, and a retracted position removed from the optical path from the taking lens to the image sensing element; this digital camera having a first photographic mode wherein the optical element is set at an advanced position for photography, and a second photographic mode wherein the optical element is set at a retracted position for photography, and the light entering the image sensing element is equalized in the first photographic mode and the second photographic mode by moving the image sensing element.

These and other objects, advantages and features of the invention will become apparent from the following description thereof taken in conjunction with the accompanying drawings, which illustrate specific embodiments of the invention.

BRIEF DESCRIPTION OF THE DRAWINGS

In the following description, like parts are designated by like reference numbers throughout the several drawings.

DETAILED DESCRIPTION OF THE PREFERRED EMBODIMENTS

Figure 1:
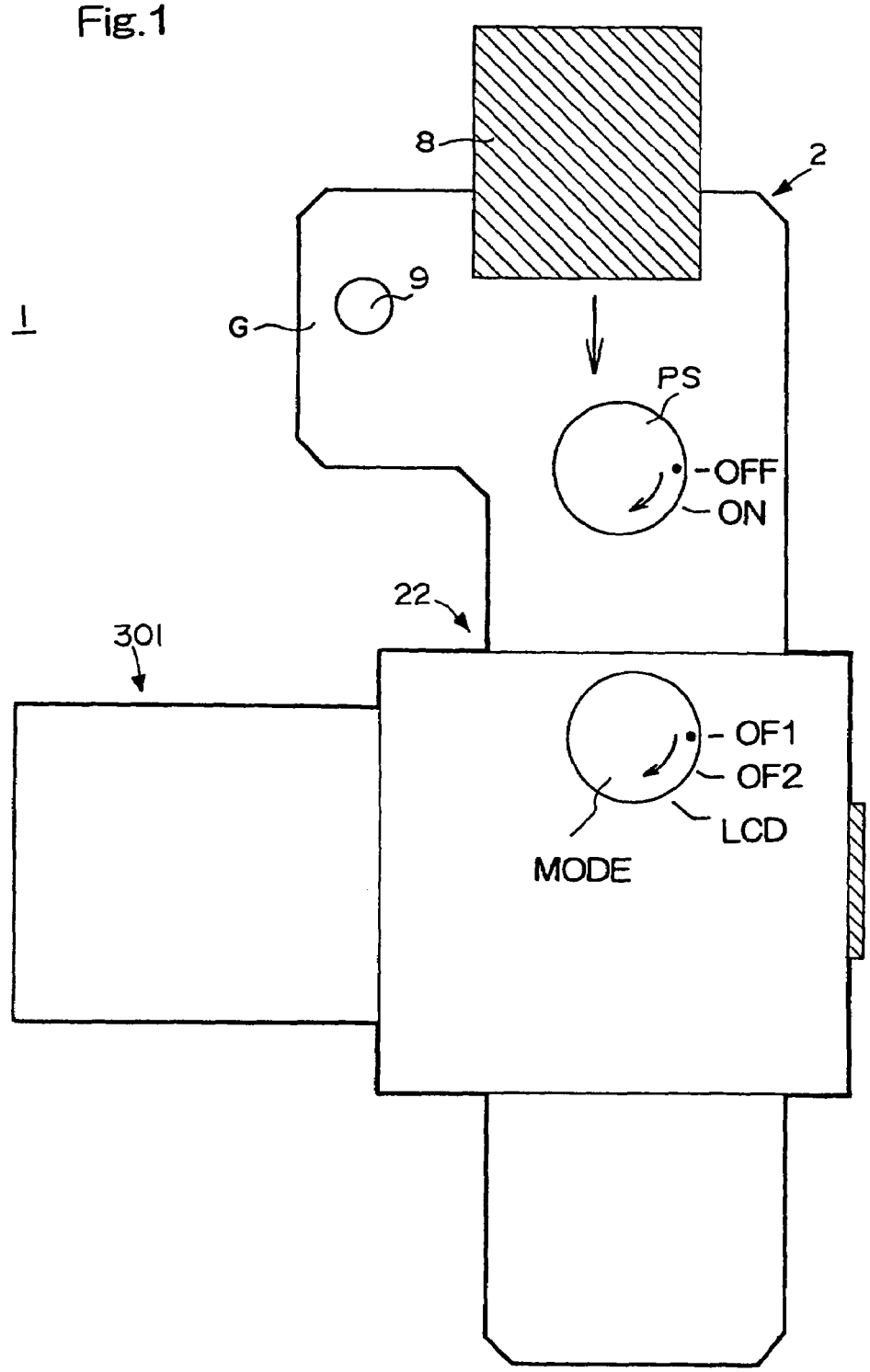
FIG. 1 is a top view of the digital camera of a first embodiment of the present invention.
Figure 2:
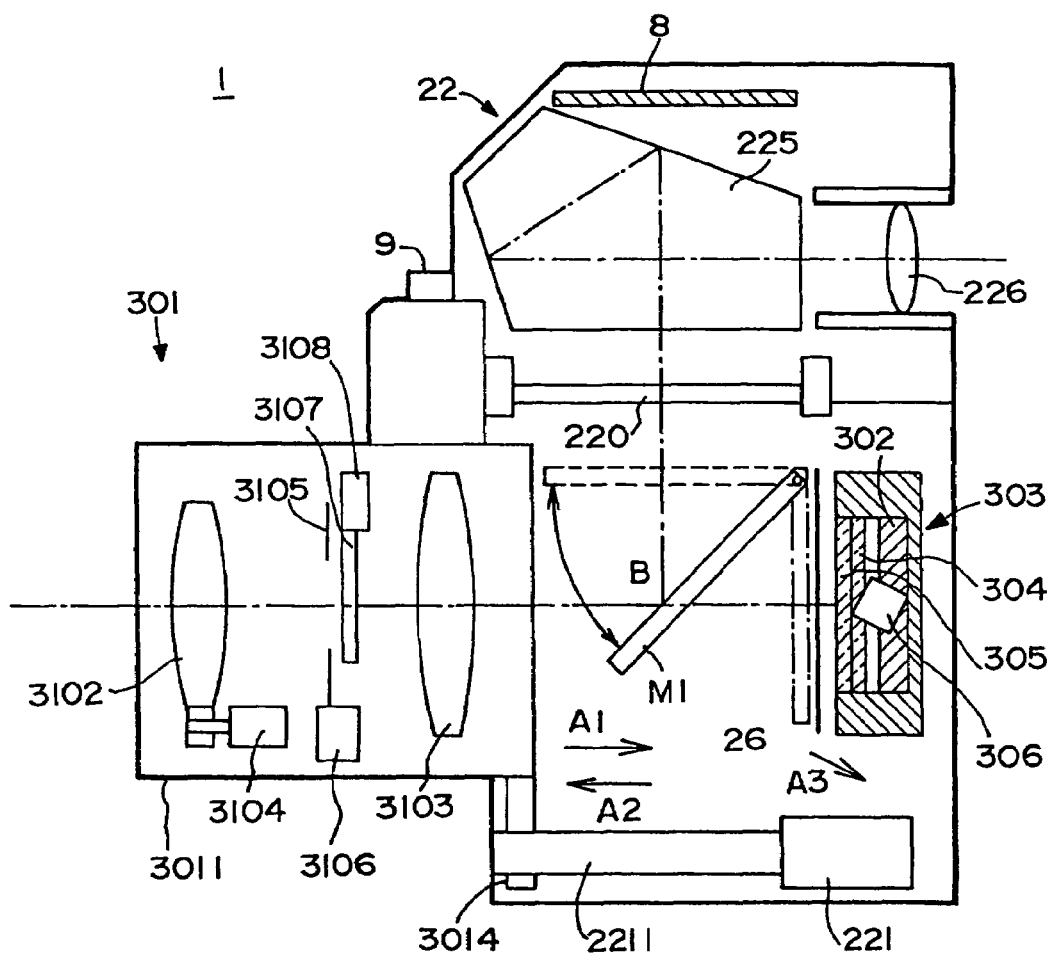
FIG. 2 is a sectional view of the digital camera of FIG. 1.
Figure 3:
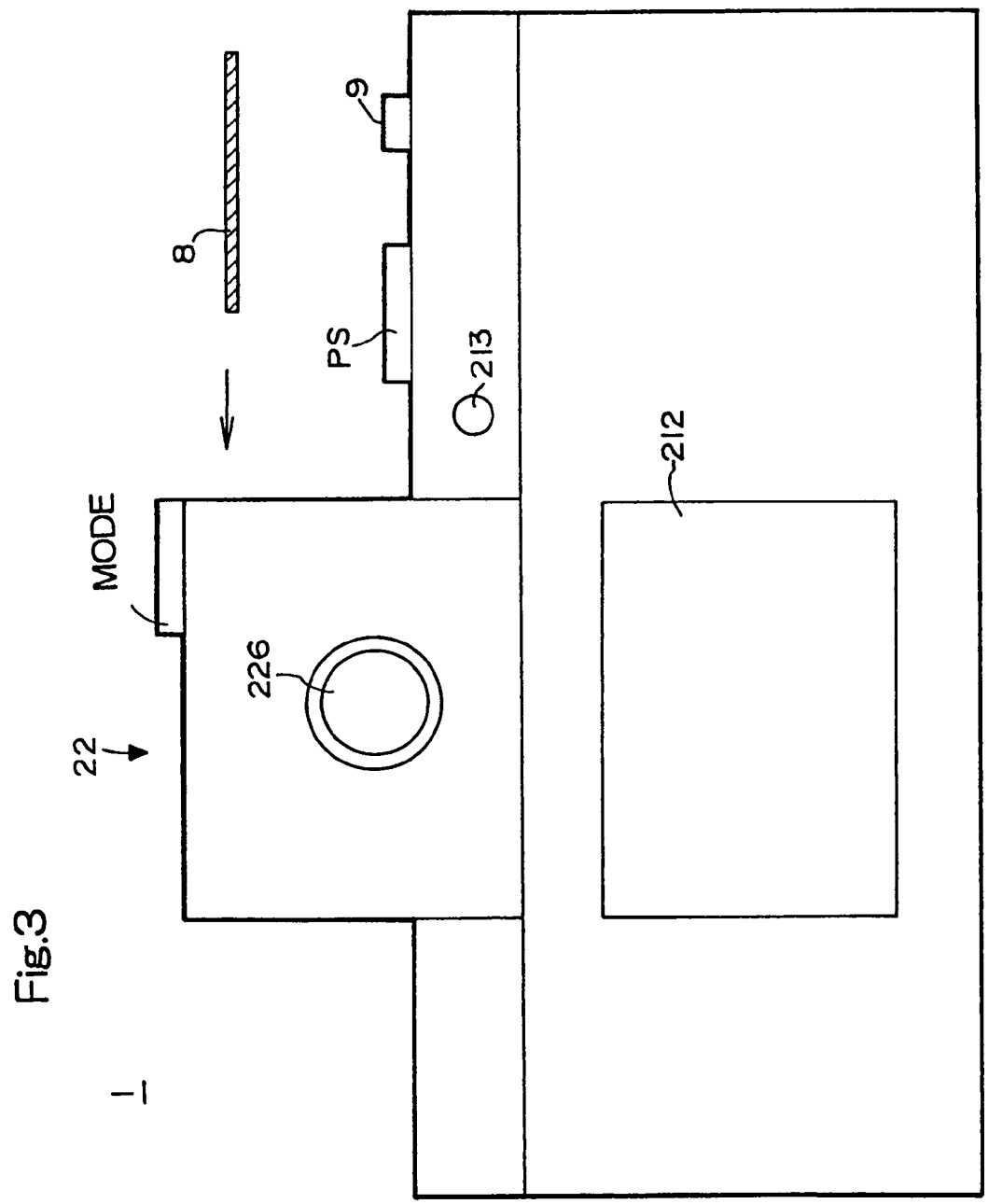
FIG. 3 is a back view of the digital camera of FIG. 1.

The embodiments of the present invention are described hereinafter with reference to the accompanying drawings. FIGS. 1, 2, and 3 are, respectively, a top view, section view viewed from the side, and back view of the digital camera 1 of a first embodiment. The digital camera 1 comprises a camera body 2, a taking lens 301 detachably attached to the camera body 2, and an optical finder 22. A grip G is formed on the camera body 2 to allow the camera to be held by a user, and a shutter release button 9 is provided at the top of the grip G. The interior of the grip G forms a battery compartment, which accommodates four "AA"-size batteries. A power switch PS is provided on the top of the camera body.

The camera body 2 is an SLR type provided with a quick return mirror. A quick return M1 having at one end a rotating shaft in a direction perpendicular to the optical axis of the taking lens 301 rotates from a position (this is the advanced position indicated by the solid line in FIG. 2) intersecting the optical axis of the taking lens 301 at an angle of 45° to a position (this is the retracted position indicated by the dashed line in FIG. 2) on the finder 22 side outside the optical path, and the focal plane shutter 26 opens when the shutter release button 9 is pressed. In this way the light transmitted through the taking lens 301 forms an image on the image sensing element, i.e., CCD 302, and the image is sensed by converting the light received by each pixel of the CCD 302 to an electrical signal. The CCD 302 is accommodated within the CCD unit 303.

The taking lens 301 is a zoom lens comprising a first lens unit 3102 and a second lens unit 3103. The first lens unit 3102 is driven by a zoom motor 3104 provided inside a lens barrel 3011. The entire taking lens 301 has a variable focal length by changing the spacing of the first lens unit 3102 and the second lens unit 3103 so as to realize the zoom function.

A stepping motor 221 is provided within the camera body 2 to drive the taking lens 301, and the rotating shaft of the stepping motor 221 is connected to a screw 2211. The screw 2211 engages a connecting hole 3014 provided at the back end of the lens barrel 3011, such that the entire taking lens 301 is moved in the direction of the optical axis of the taking lens 301 by the rotational drive of the stepping motor 2211. In this way focusing adjustment is accomplished for the taking lens 301. In the digital camera 1, the taking lens 301 is moved in the direction indicated by the arrow A in FIG. 2 such that the majority part of the taking lens 301 is housed within the camera body 2 when not in use. The housing of the taking lens 301 in the camera body 2 is also accomplished by the motor 221.

A stop 3105, and stop control driver 3106 are provided within the lens barrel 3011 of the taking lens 301, and an ND filter 3107 for light adjustment, and an actuator 3108 for advancing and retracting this ND filter in the optical path are provided.

The quick return mirror M1 is a semitransparent mirror, and a reflective film is provided on the surface on the taking lens 301 side. The transmittancy of the mirror M1 is set at 70%; accordingly, 30% of the light transmitted through the taking lens 301 is directed to the finder 22 side even when the mirror M1 is set at the advanced position, and the remaining 70% of the light is directed to the CCD 302 side. For this reason, photography is possible not only when the mirror M1 is set at the retracted position, but also when the mirror M1 is set at the advanced position. In the digital camera 1, it is possible to select a photographic mode wherein the quick return mirror M1 is rotated to the retracted position in accordance with the operation of the shutter release button 9, as well as a photographic mode wherein the quick return mirror M1 stops at the advanced position via the operation of the shutter release button 9. In the latter mode, a user can verify the composition in the optical finder 22 during photography by the CCD 302.

The CCD unit 303, in addition to the CCD 302, is provided with an integrated spatial low pass filter 304 for controlling the frequency characteristics of the light received by the CCD 302, and infrared cutting filter 304 for correcting the spectral sensitivity characteristics of the CCD 302. When the quick return mirror M1 remains at the advanced position during photography, the CCD unit 303 is displaced in the direction indicated by the arrow A3 in FIG. 2 by a drive unit 306, so as to compensate for the difference in the optical path as when the mirror M1 is set at the retracted position. That is, when the mirror M1 is set at the advanced position, the focal position is displaced in the arrow A3 direction compared to when the mirror M1 is set at the retracted position, such that the focal position is corrected by this displacement to behind and below the CCD unit 303.

The difference in the optical path length is eliminated by the displacement of the CCD unit 303 front and back directions, and the difference in the image forming position of the light on the CCD 302 is eliminated by displacement in the vertical directions. The amount of displacement of the CCD unit 303 is set in consideration of the thickness and refractive index of the mirror M1, and the inclination relative to the optical axis of the taking lens 301 at the advanced position.

Figure 4:
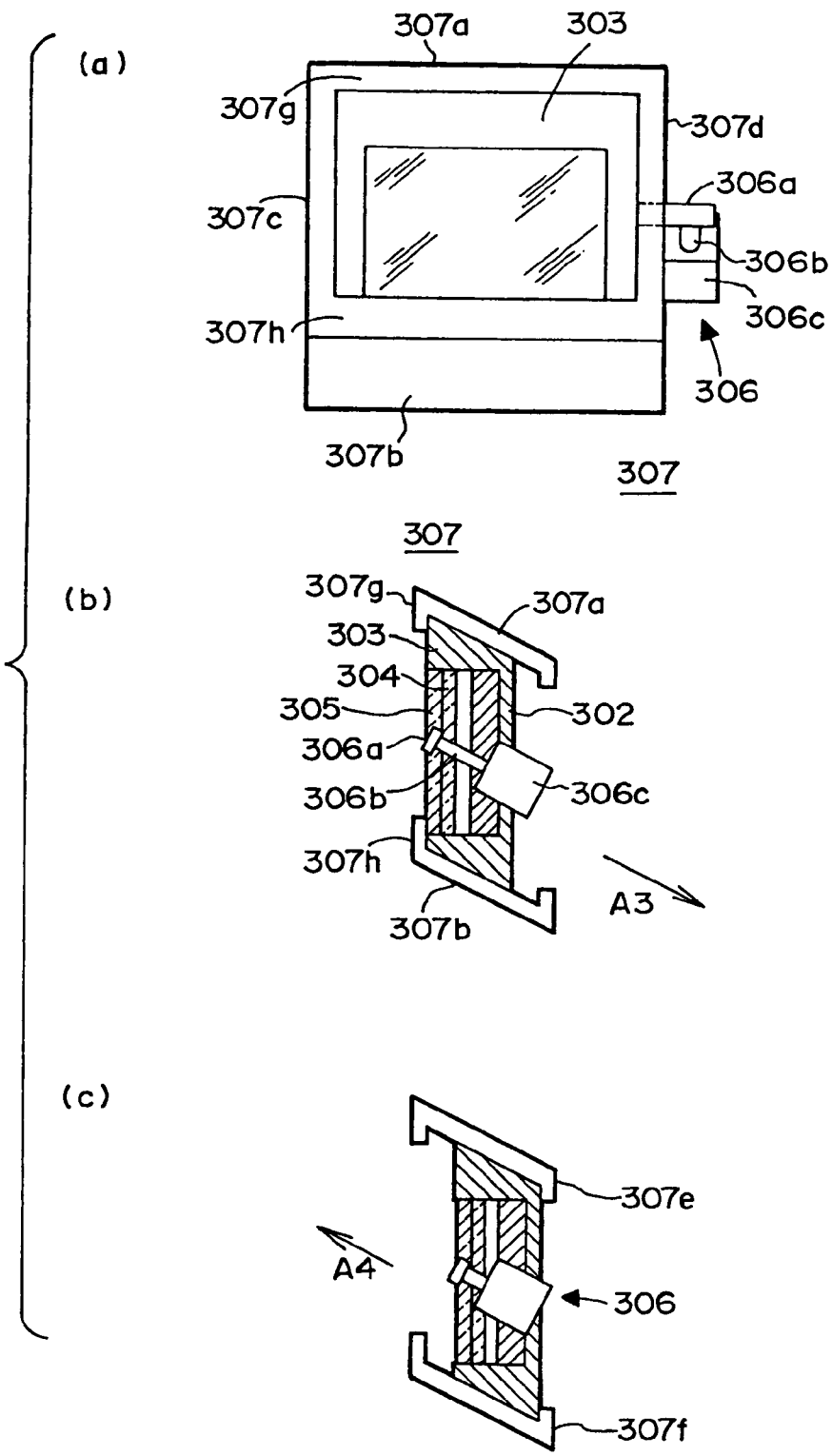
FIG. 4 is a front view and sectional view of the CCD unit displacement mechanism of the digital camera of FIG. 1.

The mechanism 307 for displacing the CCD unit 303 is shown in FIG. 4. In FIG. 4, (a) is a front view of the displacement mechanism 307, (b) is a sectional view of the displacement mechanism 307 when the CCD unit 303 is not displaced, i.e., when the mirror M1 is set at the retracted position, and (c) is a sectional view of the displacement mechanism 307 when the CCD unit 303 is displaced, i.e., when the mirror M1 is set at the advanced position.

The CCD unit 303 has a cross section that is a parallelogram, and the four side surfaces contact the guides 307a, 307b, 307c, 207d, so as to be oscillatable. The guides 307a–307d are fixedly attached to the camera body 2. On the side of the guide 307d is formed a slot along the displacement direction of the CCD unit 303, and a connector 306a integratedly formed with the CCD unit 303 protrudes from this slot to the outside. On the exterior side of the guide 307d is fixedly attached a drive unit 306 for driving the CCD unit 303.

The drive unit 306 comprises a cylinder 306c and a plunger 306b which slides inside the cylinder, such that the plunger 306b is moved by an electromagnet provided within the cylinder 306c. The tip of the plunger 306b is connected to the connector 306a provided on the CCD unit 303.

In addition to an electromagnet, permanent magnets are provided on the plunger 306b and the cylinder 306c of the drive unit 306. These permanent magnets are arranged such that the in-line direction of both poles matches the direction of movement of the plunger. The direction from the N-pole to the S-pole is reversed for the permanent magnet of the plunger and the permanent magnet of the cylinder, and the distance between both poles of the magnet of the plunger is set to approximately one half the distance between both poles of the magnet of the cylinder. Accordingly, when current is not applied to the electromagnet, the plunger is stably maintained at two places, i.e., a position at which the N-pole of the plunger faces the S-pole of the cylinder, and a position at which the S-pole of the plunger faces the N-pole of the cylinder.

According to this construction, the drive unit 306 is a self-maintained type supporting the position of the movable plunger 306b at two places without an external force. The electromagnet generates a larger attraction force than the permanent magnets of the plunger and cylinder, so as to move the plunger. The strength of the permanent magnets of the plunger and cylinder is set low so as to be within a range that does not move the plunger under a slight impact, and the power consumption of the electromagnet is slight. Furthermore, after the plunger is moved, it is no longer necessary to supply a current to the electromagnet, and there is no power consumption other than for movement.

When power is applied to the drive unit 306 in the forward direction with the CCD unit 303 at the position on the front side (top) of the camera body 2 as shown in section (b) of FIG. 4), the plunger 306b is moved in the arrow A3 direction, and the CCD unit 303 is moved in the same direction. The CCD unit 303 is stopped when abutting the back ends 307e and 307f of the guides 307a and 307b, and is positioned at the back side (bottom) of the camera body 2 as shown in section (c) of FIG. 4. When power is applied to the drive unit 306 in the reverse direction with the CCD unit 303 positioned at the back side as shown in section (c) of FIG. 4, the plunger 306b is moved in the arrow A4 direction, and the CCD unit 303 is moved in the same direction. The CCD unit 303 is stopped when abutting the front ends 307g and 307h of the guides 307a and 307b, and is positioned at the front side indicated in section (b) of FIG. 4.

One self supporting position of the plunger 306b of the drive unit 306 is set slightly behind the back ends 307e and 307f of the guides 307a and 307b, and the other self supporting position is set slightly in front of the front ends 307g and 307h of the guides 307a and 307b. For this reason a force is exerted on the CCD unit 303 to press the back ends 307a and 307b or the front ends 307g and 307h, such that the position of the CCD unit 303 is determined by the guides 307a and 307b. Accordingly, the position of the CCD unit 303 is precisely determined.

Although self support of the drive unit 306 is realized using the attraction force of the permanent magnets, the CCD unit 303 also can be pressed to the front side or the back side of the guides 307a and 307b by the repulsion force of the permanent magnets.

Alternatively to using a self supporting type drive unit 306, the CCD unit 303 may be maintained on the back side by a spring when current is not applied, and moved to the front side against the force exerted by the spring when current is applied. Conversely, the CCD unit 303 may be maintained on the front side by a spring when current is not applied, and moved to the back side against the force exerted by the spring when current is applied. The CCD unit 303 can be returned to the back side or the front side by stopping the current applied to the drive unit 306.

As shown in FIG. 2, a focusing screen 220, pentagonal roof prism 225 and eyepiece lens 226 are provided within the finder 22 of the digital camera 1. The optical path length from the intersection point B of the mirror M1 and the optical axis of the taking lens 301 to the screen 220 when the quick return mirror M1 is set at the advanced position, and the optical path length from the intersection point B to the photoreceptor surface of the CCD 302 when the CCD unit 303 is set at the front side position (section (b) of FIG. 4) are set so as to be equal. Accordingly, when the mirror M1 is moved to the retracted position for photography after confirming the focus state by the image formed on the screen 220, a focused photographic image is ensured even if the CCD unit 303 is not moved to the back side position (section (c) of FIG. 4).

The digital camera 1 may accept the installation of a memory card 8 for recording photographed images. The memory card 8 is removably installed, and is inserted within the finder 22 as shown in FIGS. 1 and 3. A slot for inserting the memory card 8 is provided on the right side of the finder 22.

As shown in FIG. 3, a liquid crystal display (LCD) 212 is provided on the back side of the camera body 2. The LCD 212 functions as a video finder by directly displaying the image sensed by the CCD 302. The LCD 212 also can display the reproduction of an image recorded on the memory card 8. A display button 213 is provided on the back of the camera body 2 for switching ON/OFF the LCD 212. The power to the LCD 212 is switched ON or OFF each time the displayed button 213 is pressed.

A mode selection dial MODE is provided on the top of the optical finder 22 for setting the operating mode such as a photographic mode of the digital camera 1.

The digital camera 1 has three photographic modes using the finder. These three photographic modes are: the optical finder mode 1 (OF1), optical finder mode 2 (OF2), and liquid crystal finder mode (LCD). The optical finder modes 1 and 2 are modes using both the optical finder 22 and the LCD 212, and the liquid crystal finder mode is a mode using only the LCD 212.

In the optical finder mode 1, the quick return mirror M1 is moved to the retracted position when photographing an image to be recorded, and at other times the mirror M1 is held at the advanced position. In the optical finder mode 2, the quick return mirror M1 is normally held at the advanced position. In the liquid crystal finder mode, the quick return mirror M1 is normally held at the retracted position. Table 1 shows the position of the quick return mirror M1, ON/OFF of the LCD 212, valid/invalid display button 213, and position of the CCD unit 303 when recording an image and at other times.

TABLE 1

| Setting | Nonrecording photo | Recording photo |
|---|---|---|
| Optical finder mode 1 (OF1) | | |
| Mirror M1 | Retracted | Retracted |
| LCD 212 | ON or OFF | ON or OFF |
| Display button 213 | Valid | Valid |
| CCD unit 303 | Back position (LCD ON) Front position (LCD OFF) | Front position |
| Optical finder mode 2 (OF2) | | |
| Mirror M1 | Advanced | advanced |
| LCD 212 | ON or OFF | ON or OFF |
| Display button 213 | Valid | Valid |
| CCD unit 303 | Back position | Back position |
| Liquid crystal finder mode (LCD) | | |
| Mirror M1 | Retracted | Retracted |
| LCD 212 | ON | ON |
| Display button 213 | Valid | Valid |
| CCD unit 303 | Front position | Front position |

In the optical finder modes 1 and 2, the display button 213 is operational, and the ON/OFF state of the LCD 212 is switched in accordance with the operation of the display button 213. In the liquid crystal finder mode, the operation of the display button 213 is invalid, and the LCD 212 is forcibly set to the ON state. In the liquid crystal finder mode, although a situation arises wherein no finder image is obtained when the operation of the display button 213 is valid at this time because no image is formed in the optical finder 22, confusion of the user is avoided by forcibly turning ON the LCD 212 to display a projection image.

In each photographic mode excluding the non-recording image photography of the optical finder mode 1, the position of the CCD unit 303 is set at either the front side as shown in section (b) of FIG. 4, or the back side as shown in section (c) of FIG. 4 in accordance with the quick return mirror M1 being set at either the advanced position or the retracted position. Accordingly, excluding a short period when the photographic mode is switched and the LCD 212 is switched ON/OFF in the optical finder mode 1, there is no dislocation of the focal point caused by a difference in position of the mirror M1 in the image displayed on the display 212.

If the LCD 212 is OFF in the optical finder mode 1, the CCD unit 303 is set at the front position even when the quick return mirror 1 is at the retracted position. When, in this state, the display button 213 is operated to start the display on the LCD 212, the display does not start immediately, but the rather the display starts after the CCD unit 303 completes the movement to the back side. For this reason an unfocused condition in the images sensed one by one in a predetermined time interval by the CCD 302 is not displayed on the display 212.

Figure 5:
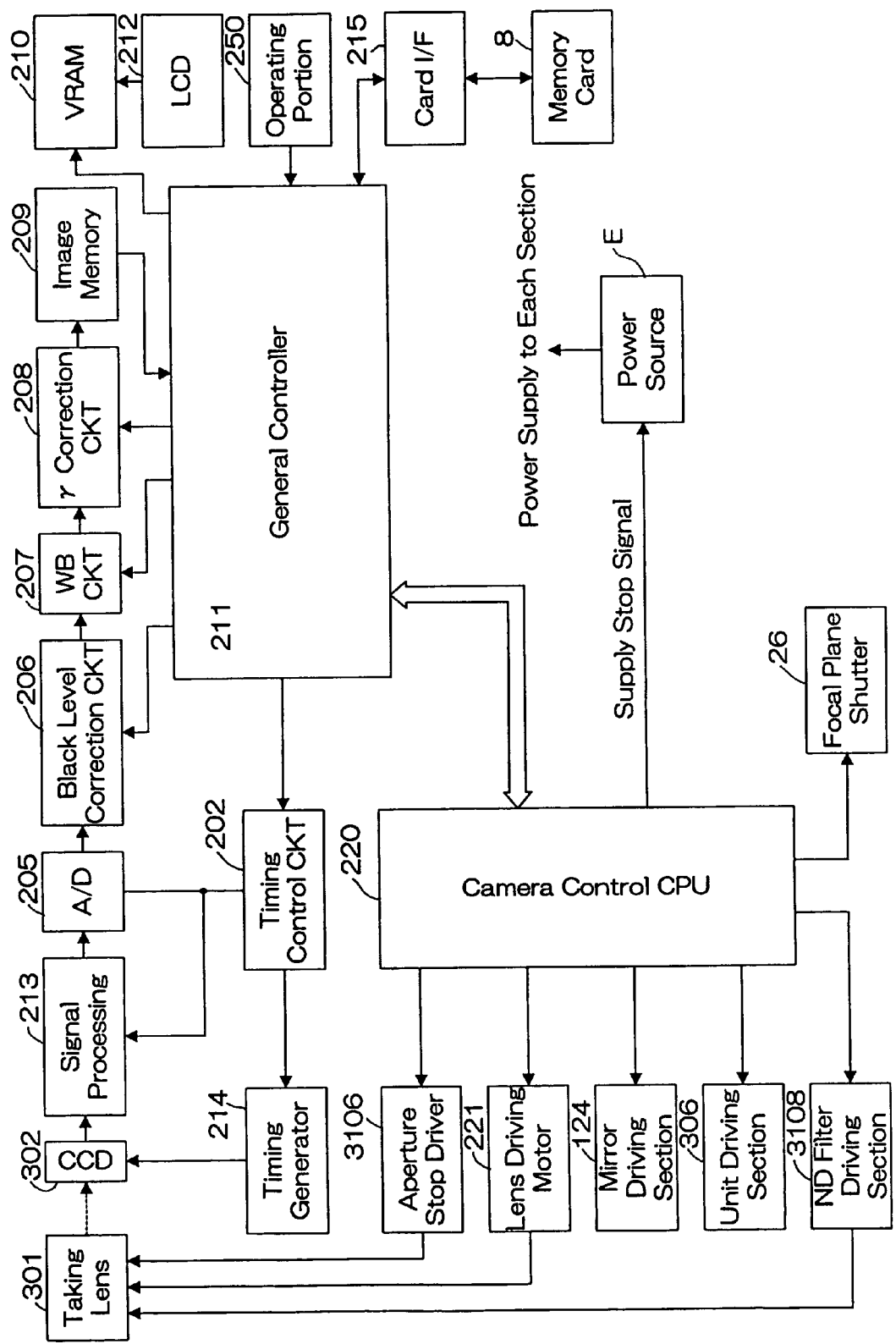
FIG. 5 is a block diagram briefly showing the circuit structure of the digital camera of FIG. 1.

The circuit structure of the digital camera 1 is briefly shown in FIG. 5. The digital camera 1 is provided with a general controller 211, and a camera control CPU 220. The general controller 211 controls photography by the CCD 302 and the processing of the signals output therefrom, and monitors the setting state and input operation of the operation unit 250 including the switches provided on the digital camera 1, i.e., the shutter release button 9, power switch PS, display button 213 and the like. The general controller 211 also controls the ON/OFF switching of the LCD 212, and the reading/writing of the memory card 8.

The camera control CPU 220 controls the various parts not controlled by the general controller 211, such as the quick return mirror M1, CCD unit displacement mechanism 307, focal plane shutter 26 and the like, and also controls the general controller 211. The general controller 211 and the camera control CPU 220 exchange information required for control, and the camera control CPU 220 also performs all controls relating to the taking lens 301. For example, focusing control of the taking lens 301 via the lens drive motor 221 and housing the taking lens 301 in the camera body 2, adjustment of the stop 3105 via the stop control driver 3106, and setting the ND filter 3107 via the actuator 3108.

The digital camera 1 is provided with a timing control circuit 202, timing generator 214, signal processing circuit 213, A/D converter 205, black level correction circuit 206, WB (white balance) circuit 207, gamma correction circuit 208, and image memory 209 for photography by the CCD 302 and processing the signal output therefrom, and is provided with a VRAM 210 for image display by the LCD 212.

The CCD 302 has three types of pixels alternating in a fixed two-dimensional pattern to selectively photoelectrically convert the R (red), G (green), and B (blue) color components of the light. The CCD 302 converts the optical image of a photographic object formed by the lens 301 to R, G, B color component image signals (signals comprising a row of pixel signals generated by photoelectric conversion of each pixel) for output.

The timing generator 214 generates various timing pulses for controlling the operation of the CCD 302. Generation of the timing pulses is based on a standard clock signal from the timing control circuit 202. The timing pulse generated by the timing generator 214 and supplied to the CCD 302 includes for example, photoelectric conversion control signal for specifying the start/end (exposure start/end) of an integral, and reading control signal (horizontal synchronization signal, vertical synchronization signal, transfer signal and the like) specifying the output time of each pixel.

The signal processing circuit 213 performs specific analog processing of the image signals (analog signals) output from the CCD 302. Specifically, the signal processing circuit 213 has a CDS (correlation double sampling) circuit and an AGC (auto gain control) circuit, wherein the CDS circuit reduces noise in the image signal, and the AGC circuit adjusts the level of the image signal by adjusting the gain.

The A/D converter 205 converts each analog pixel signal included in the image signal to a 10-bit digital signal. This A/D conversion is executed based on an A/D conversion clock signal supplied from the timing control circuit 202.

The black level correction circuit 206 corrects the black level of the A/D converted pixel; signal (hereinafter referred to as "pixel data") to a standard black level.

The WB circuit 207 performs level conversion of the pixel data of each R, G, B color component to adjust the white balance. This level conversion is to control the white balance to a level in which the white balance is properly adjusted after gamma correction. The WB circuit 207 converts the level of the pixel data of each R, G, B color component with reference to a level conversion table within the general controller 211. The conversion coefficient (characteristic slope) of each color component of the conversion table is set for each photographic image by the general controller 211.

The gamma correction circuit 208 corrects the gamma characteristic of the pixel data. The gamma correction circuit 208 has 6 types of gamma correction tables of differing gamma characteristics, and performs gamma correction using a gamma correction table determined beforehand in accordance with the photographic scene and photographic conditions.

The image memory 209 temporarily stores the pixel data output from the gamma correction circuit 208. The image memory 209 stores one frame of pixel data. The CCD 302 comprises 1600×1200 (horizontal×vertical) pixels; the image memory 209 has a storage capacity to store 1600× 1200 pixels, and the pixel data correspond to the pixel positions on the CCD 302.

The VRAM 210 is a buffer memory for storing pixel data of the image shown on the LCD display 212. The LCD 212 has 400×300 (horizontal×vertical) pixels, and corresponds to the storage capacity of the VRAM 210.

When the LCD 212 is turned ON for photography, the pixel data of the image sensed each 1/30 sec by the CCD 302 are processed by the previously mentioned circuits from the A/D converter 205 through the gamma correction circuit 208, and subsequently stored in the image memory 209, as well as transmitted to the VRAM 210 via the general controller 211 so as to display the image on the LCD 212. The user sets the composition while viewing this display, and is able to confirm the focus state of the taking lens 301 relative to the photographic object. In the reproduction mode, an image read out from the memory card 8 is subjected to predetermined signal processing by the general controller 211 and thereafter transferred to the VRAM 210 and displayed on the LCD 212.

A card I/F 215 is an interface for writing image data to the memory card 8, and reading image data from the memory card 8.

Although not shown in the drawing, the general controller 211 is provided with a filter unit for a filtering process used in the recording process of the photographed image, and a recording image generator for generating a compressed image and thumbnail image, and is further provided with a reproduced image generator for generating a reproduced image to display an image recorded in the memory card 8 on the LCD 212.

The filter unit corrects the high frequency component of the image to be recorded by digital filtering to adjust image quality relating to contours. The recording image generator reads pixel data from the image memory 209, and generates a compression image and thumbnail image for recording on the memory card 8. The recording image generator generates a thumbnail image by raster scanning the image memory 209, and reading pixel data separated at specific intervals in the horizontal direction and the vertical direction. The read image data are sequentially transferred to the memory card 8, and the generation and recording of the thumbnail image are executed in parallel. The thumbnail image is recorded in a thumbnail image area of the memory card 8.

The recording image generator reads all pixel data from the image memory 209, and subjects all pixel data to two-dimensional DCT (discrete cosine transform), and specific compression processing via the JPEG method such as Huffman coding to generate a compressed image. The generated compressed image is transferred to the memory card 8 and recorded in the main image area.

When photography is specified by the operation of the shutter release button 9, the general controller 211 generates a compressed image and thumbnail image from the pixel data recorded in the image memory 209, and records both images and tag information (i.e., frame number, exposure value, shutter speed, date/time of photograph, scene information, image results and the like) relating to the photographic images in the memory card 8.

The camera control CPU 220 also controls the power supplied from the power unit E comprising a battery or the like. When the power switch PS is operated to specify stopping the power supply, the camera control CPU 220 issues a stop signal to the power unit E, and the power unit E stops the supply of power in accordance with this signal.

Figure 6:
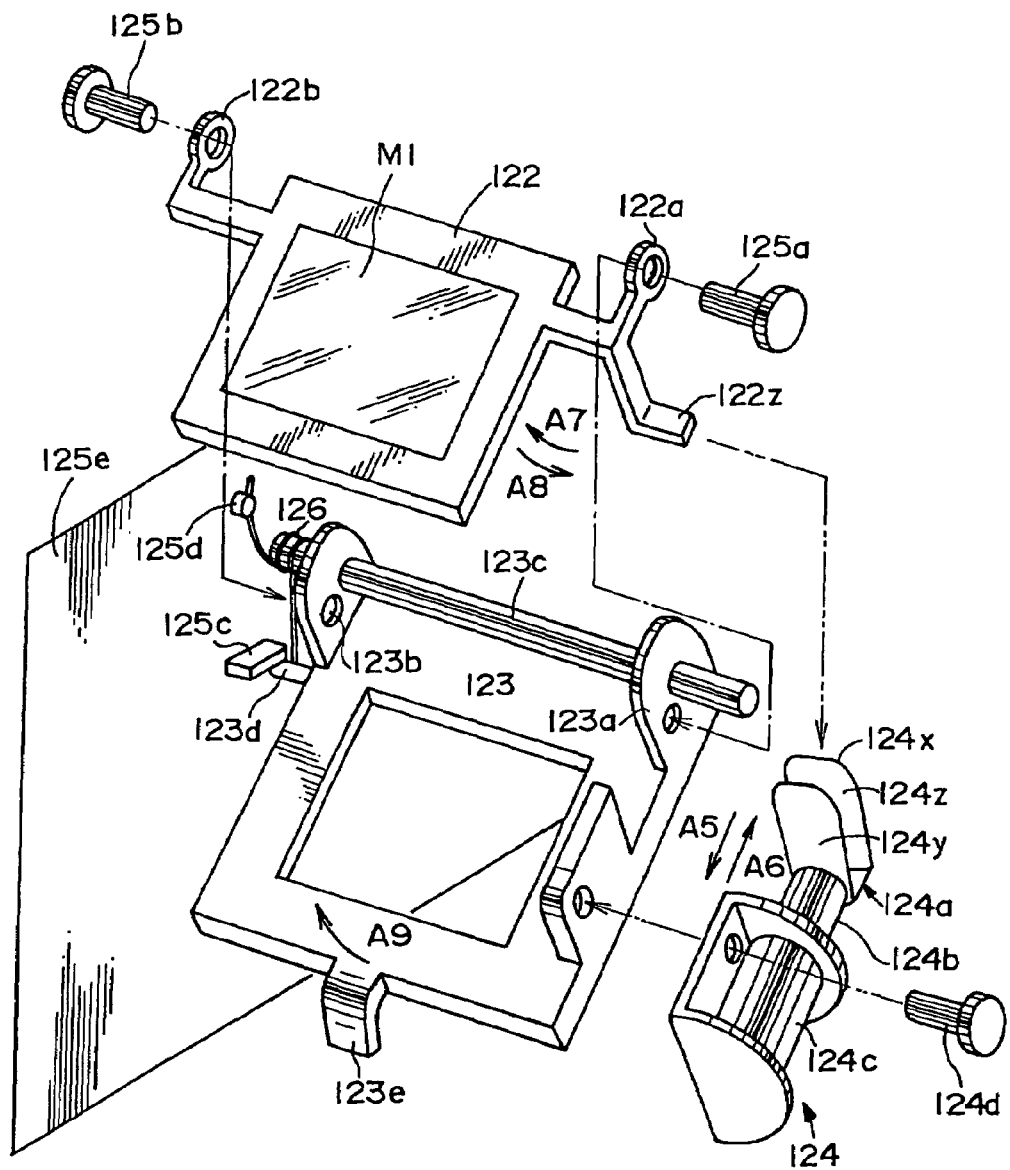
FIG. 6 is an exploded perspective view of the quick return mirror drive mechanism of the digital camera of FIG. 1.

The drive mechanism of the quick return mirror M1 is described below with reference to FIG. 6. The quick return mirror M1 is fixedly attached via an adhesive to a holding frame 122 having a large opening, and the holding frame 122 is supported on a mirror base 123 functioning as a support member. The holding frame 122 has arms protruding from the sides near the ends of the frame, and holes 122a and 122b are formed in these arms. The mirror base 123 has an opening of a size identical to the opening of the holding frame 122, and holes 123a and 123b are formed at a position corresponding to the holes 122a and 122b of the holding frame 122.

A shaft 125a is inserted through the hole 122a of the holding frame 122 and the hole 123a of the mirror base 123, and a shaft 125b is inserted through the holes 122b and 123b. The shafts 125a and 125b are on the same straight line, such that the holding frame 122 is rotatable relative to the mirror base 123 about the shafts 125a and 125b.

The mirror base 123 is arranged at an inclination on the optical path from the taking lens 301 to the CCD 302 with the shafts 125a and 125b align in a direction perpendicular to the optical axis of the taking lens 301, so as to have the shafts 125a and 125b on the back side (CCD302 side), and top side (optical finder 22 side) when viewed from a position crossing the optical axis. Although the holding frame 122 is rotatable, it is regulated at one end of the rotation range by abutting the mirror base 123. When the holding frame 122 abuts the mirror base 123, the quick return mirror M1 is set at the advanced position at an angle of 45° relative to the optical axis of the taking lens 301.

A drive unit 124 is provided on the side of the mirror base 123 for rotating the mirror M1 together with the holding frame 122. The drive unit 124 comprises a cylinder 124c, and a plunger 124b oscillating within the cylinder, such that the plunger 124b is caused to move by an electromagnet provided within the cylinder 124c. The cylinder 124c is fixedly attached to the mirror base 123 by a screw 124d. Fixedly attached the tip of the plunger 124b is a connector 124a comprising two parallel protrusions 124x and 124y, and a protrusion 122z provided on the arm of the holing frame 122 passes through a space 124z between the protrusions 124x and 124y. The protrusion 122z of the holding frame 122 is oscillatable within the space 124z.

When the holding frame 122 abuts the mirror base 123 and the mirror M1 is set at the advanced position, the drive unit 124 is in a state wherein the plunger 124b is shallowly inserted in the cylinder 124c. In this state, when a current is supplied to the drive unit 124 in the forward direction, the plunger 124b moves in the arrow A5 direction, and is deeply inserted into the cylinder 124c. In this way the protrusion 122z of the holding frame 122 slidingly moves within the space 124z, producing rotation in the arrow A7 direction about the shafts 125a and 125b, such that the quick return mirror M1 is moved to the retracted position together with the holding frame 122.

When a current is supplied to the drive unit 124 in the reverse direction with the mirror M1 set at the retracted position, the plunger 124b moves in the arrow A6 direction, and returns to the shallow insertion position in the cylinder 124c. In this way the protrusion 122z of the holding frame 122 slidingly moves within the space 124z, producing rotation in the arrow A8 direction about the shafts 125*a* and 125*b*, such that the quick return mirror M1 is moved to the advanced position at which the holding frame 122 abuts the mirror base 123.

The drive unit 124 for driving the quick return mirror M1 is a self supporting type similar to the drive unit 306 of the displacement mechanism 307 of the CCD unit 303 previously described. Specifically, in addition to an electromagnet, permanent magnets are be provided on the plunger 124*b* and the cylinder 124*c* of the drive unit 124. These permanent magnets are arranged such that the in-line direction of both poles matches the direction of movement of the plunger. The direction from the N-pole to the S-pole is reversed for the permanent magnet of the plunger and the permanent magnet of the cylinder, and the distance between both poles of the magnet of the plunger is set to approximately one half the distance between both poles of the magnet of the cylinder. Accordingly, when current is not applied to the electromagnet, the plunger is stably maintained at two places, i.e., a position at which the N-pole of the plunger faces the S-pole of the cylinder, and a position at which the S-pole of the plunger faces the N-pole of the cylinder.

The electromagnet generates a larger attraction force than the permanent magnets of the plunger and cylinder, so as to move the plunger. The strength of the permanent magnets of the plunger and cylinder is set low so as to be within a range that does not move the plunger under a slight impact, and the power consumption of the electromagnet is slight. Furthermore, after the plunger is moved, it is no longer necessary to supply a current to the electromagnet, and there is no power consumption other than for movement.

One self-supporting position of the plunger 124 of the drive unit 124 is set so as to be slightly shallower within the cylinder 124*c* than the position at which the holding frame 122 abuts the mirror base 123. For this reason a force is exerted on the holding frame 122 pressing against the mirror base 123, and the mirror M1 advanced position is determined by the mirror base 123. Accordingly, the advanced position of the mirror M1 is precisely determined.

On the other hand, the retracted position of the mirror M1 corresponds to the other self-supporting position of the plunger 124*b*. The retracted position of the mirror M1 may be freely placed insofar as the retracted position of the mirror M1 is removed from the optical path from the taking lens 301 to the CCD 302 and is in a range not contacting the screen 220, and slight error in the holding position of the plunger are allowed. A member for regulating the retracted position of the mirror M1 may be provided on either the mirror base 123 or the camera body 2. Furthermore, the plunger 124*b* also may be constructed so as to contact the cylinder 124*c*, so as to regulate the retracted position.

Although self support of the drive unit 124 is realized using the attraction force of the permanent magnets, the holding frame 122 also can be pressed against the mirror base 123 by the repulsion force of the permanent magnets.

Alternatively to using a self supporting type drive unit 124, the holding frame 122 may be pressed against the mirror base 123 by a spring when current is not applied, and the holding frame 122 may be moved to the retracted position against the force exerted by the spring when current is applied. In this construction, the power consumption is restricted to a minimum level in the optical finder modes 1 and 2 because power is supplied to the drive unit 124 only during photography by the CCD 302. Conversely, the holding frame 122 may be maintained at the retracted position by a spring when current is not applied, and moved to the advanced position against the force exerted by the spring when current is applied. In this construction, the power consumption is restricted to a minimum level in the liquid crystal finder mode.

In the digital camera 1 described above, the taking lens 301 can be housed within the camera body 2. In order to realize this arrangement, the mirror base 123 is constructed so as to be rotatable. The mirror base 123 has a hole for the insertion of the shaft 123*c* near the holes 123*a* and 123*b* for the insertion of the rotating shafts 125*a* and 125*b* of the holding frame 122. The shaft 123*c* is parallel to the rotating shafts 125*a* and 125*b*, and the bilateral ends are fixedly attached to the side panel of the camera body 2. The mirror base 123 rotates around the shaft 123*c*.

A spring 126 is wrapped around one end of the rotating shaft 123*c*, and one end of the spring 126 is connected to the protrusion 125*d* provided on the side panel 125*e* of the camera body 2, and the other end of the spring 126 is connected to the protrusion 123*d* provided on the side of the mirror base 123. The spring 126 exerts a force on the mirror base 123 in the arrow A9 direction (the direction of the mirror M1 toward the retracted position). Provided on the side panel 125*e* of the camera body 2 is a protrusion 125*c* to contact the protrusion 123*d* of the mirror base 123, and in this way there is regulated rotation of the mirror base 123 in the arrow A9 direction via the force exerted by the spring 126. When the taking lens 301 is not housed, the mirror base 123 is set at an angle of 45° relative to the optical axis of the taking lens 301 maintained by the contact of the protrusion 123*d* with the protrusion 125*c*.

Figure 7:
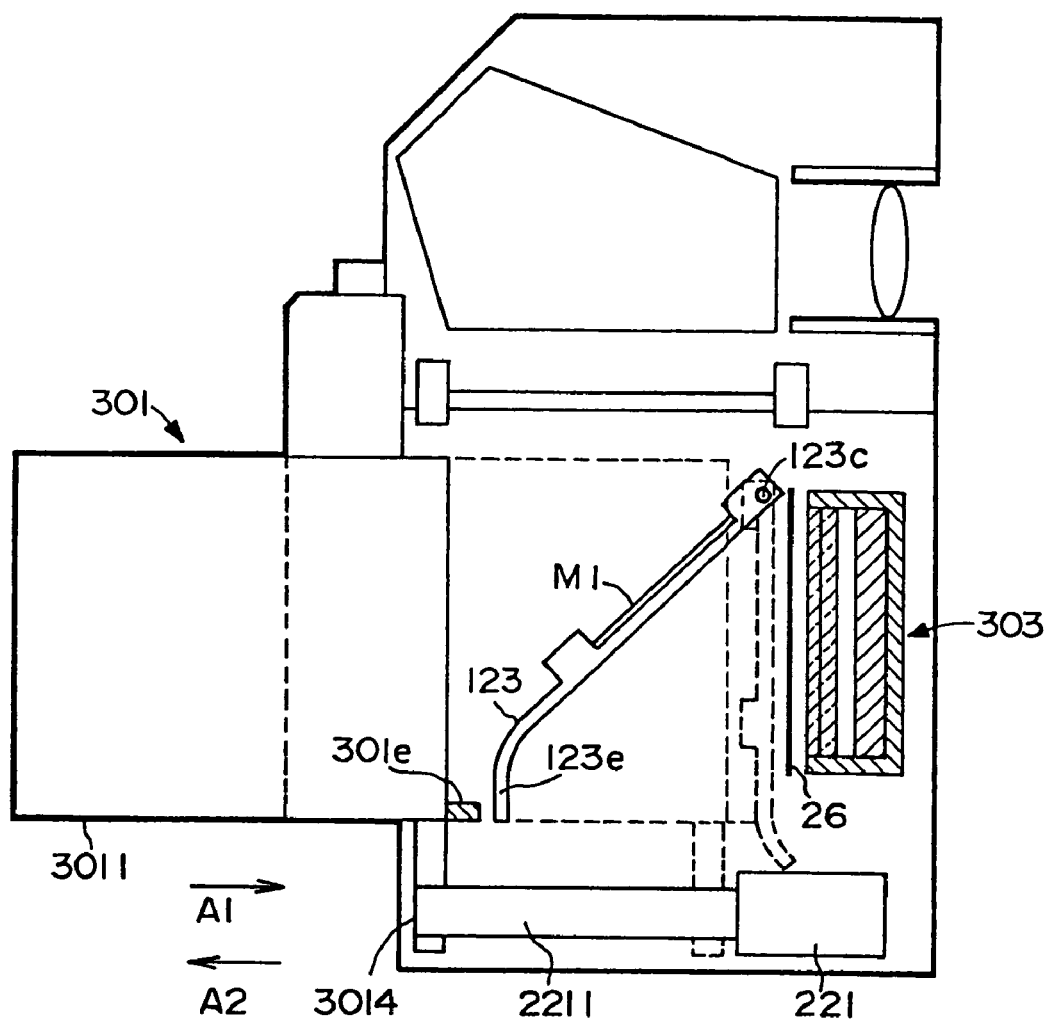
FIG. 7 is a sectional view showing the relationship of the taking lens and the mirror support base in the digital camera of FIG. 1.

A protrusion 123*e* is formed on the bottom end of the mirror base 123. The protrusion 123*e* is formed in a smoothly curved shape, with the tip facing downward. FIG. 7 shows a cross section view of the digital camera 1 viewed from the side. Formed on the bottom back edge of the lens barrel 3011 of the taking lens 301 is a protrusion 301*e* for contacting protrusion 123*e* of the mirror base 123. The dashed line in FIG. 7 represents the taking lens 301 housed in the camera body 2, and the mirror base 123 at that time. When the taking lens 301 is not housed in the camera body 2, the protrusion 301*e* is separated from the protrusion 123*e*.

When the power switch PS is operated to issue instruction to stop the supply of power, the camera control CPU 220 actuates the lens drive motor 221, and the taking lens 301 is moved in the arrow A1 direction in FIGS. 2 and 7. At the stage at which the taking lens 301 exceeds the focus adjustment range at the infinity end, the protrusion 301*e* of the lens barrel 3011 abuts the protrusion 123*e*, and the mirror base 123 is pressed against the lens barrel 3011 by the movement of the taking lens 301, and rotates to the CCD unit 303 side around the rotating shaft 123*c*.

The camera control CPU 220 stops the actuation of the motor 221 to stop the taking lens 301 at the stage at which a predetermined moving distance is reached from the infinity end of the focus adjustment range. At this time, the majority of the taking lens 301 is largely housed within the camera body 2, and the mirror base 123 is slightly separated from the focal plane shutter 26 and approximately perpendicular to the optical axis of the taking lens 301 (represented by the dash-dot line in FIG. 2, and the dashed line in FIG. 7). The camera control CPU 220 stops the power supply to parts including the motor 221 simultaneously with stopping the actuation of the motor 221.

Preceding the housing operation, the camera control CPU 220 sets the quick return mirror M1 at the advanced position. In this way a collision between the mirror M1 and the taking lens 301 is avoided when the mirror M1 at the retracted position is erroneously rotated by the rotation of the mirror base 123. The camera control CPU 220 stops the power supply from the power unit E to the drive unit 124 after the quick return mirror M1 has been set at the advanced position. In this way, during the housing operation, a collision between the mirror M1 and the taking lens 301 is avoided due erroneous rotation of the mirror M1 by the drive unit 124. Accordingly, when housing the taking lens 301, there is no concern of damage to the taking lens 301 or the mirror M1.

When the power switch PS is operated to issue instruction to start the supply of power, the camera control CPU 220 actuates the lens drive motor 221, and the taking lens 301 housed in the camera body 2 is moved to a position allowing focus adjustment. The mirror base 123 on which is exerted the force of the spring 126 is rotated in the arrow A9 direction in FIG. 6 in conjunction with the movement of the taking lens 301 in a forward direction, and stops at the position at which the protrusion 123d abuts the protrusion 125c.

The camera control CPU 220 continues the actuation of the drive unit 221 even after the protrusion 301e of the lens barrel 3011 separates from the protrusion 123e of the mirror base 123, and stops the taking lens 301 when a predetermined position has been reached. This standard position may be at any location insofar as it is within a range between infinity and nearest focus positions, and is desirably set at a pan-focus position focused relative to the wide distance range so as to quickly provide a focused finder image to the user.

Even in control of the movement of the taking lens 301 to a focus adjustable position, the camera control CPU 220 stops the power supply from the power unit E to the drive unit 124 while the taking lens 301 is moving. This procedure avoids rotation of the quick return mirror M1 causing a collision with the taking lens 301 due to erroneous operation of the drive unit 124, and prevents actual damage to both elements. When the power switch PS is operated to issue instruction to supply power, the camera control CPU 220 sends instructions to start the power supply to each part excluding the drive unit 124, and the power supply to the LCD 212 is executed in accordance with the setting of the selected photographic mode and display button 213.

Figure 8:
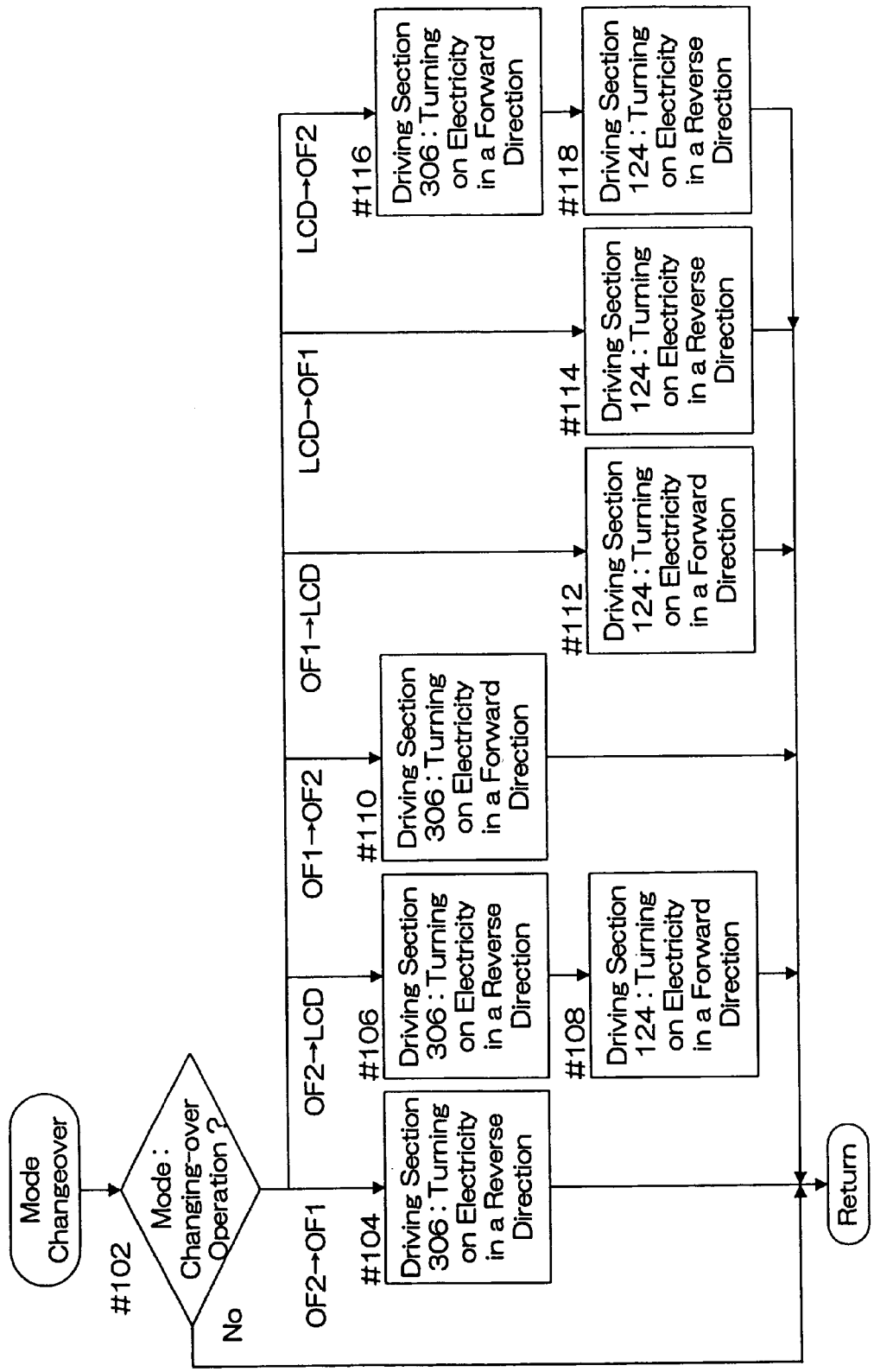
FIG. 8 is a flow chart showing the processing flow of the drive control of the CCD unit and quick return mirror in conjunction with photographic mode change in the digital camera of FIG. 1.

FIG. 8 shows the flow of the control process of the drive unit 124 of the quick return mirror M1 and the drive unit 306 of the CCD unit displacement mechanism 307 in conjunction with a change of the photographic mode. First, a check is made to determine whether or not the photographic mode has changed by operation of the mode setting dial MODE, and a determination is made as to whether or not there has been a change from any of the optical finder mode 1, optical finder mode 2, liquid crystal finder mode to any other mode (step #102).

When there has been a change from the optical finder mode 2 to the optical finder mode 1, power is supplied to the drive unit 306 in the reverse direction, and the CCD unit 303 is moved to the front side (#104). Power is not supplied to the drive unit 124, and the quick return mirror M1 is held at the advanced position. When there is a change from the optical finder mode 2 to the liquid crystal finder mode, power is supplied to the drive unit 306 in the reverse direction, and the CCD unit 303 is moved to the front side (#106), and power is supplied to the drive unit 124 in the forward direction, and the mirror M1 is rotated to the retracted position (#108).

When there is a change from the optical finder mode 1 to the optical finder mode 2, power is supplied to the drive unit 306 in the forward direction, and the CCD unit 303 is moved to the back side (#110). Power is not supplied to the drive unit 124, and the mirror M1 is held at the advanced position. When there is a change from the optical finder mode 1 to the liquid crystal finder mode, power is supplied to the drive unit 124 in the forward direction, and the mirror M1 is rotated to the retracted position (#112). Power is not supplied to the drive unit 306, and the CCD unit 303 is held at the front side position.

When there is a change from the liquid crystal finder mode to the optical finder mode 1, power is supplied to the drive unit 124 in the reverse direction, and the mirror M1 is rotated to the advanced position (#114). Power is not supplied to the drive unit 306, and the CCD unit 303 is held at the front side position. When there is a change from the liquid crystal finder mode to the optical finder mode 2, power is supplied to the drive unit 306 in the forward direction, and the CCD unit 303 is moved to the back side (#116), and power is supplied to the drive unit 124 in the reverse direction, and the mirror M1 is rotated to the advanced position (#118).

After each of the aforesaid controls, the process ends, or the process ends without action when the determination of step #102 is there has been no mode change.

Figure 9:
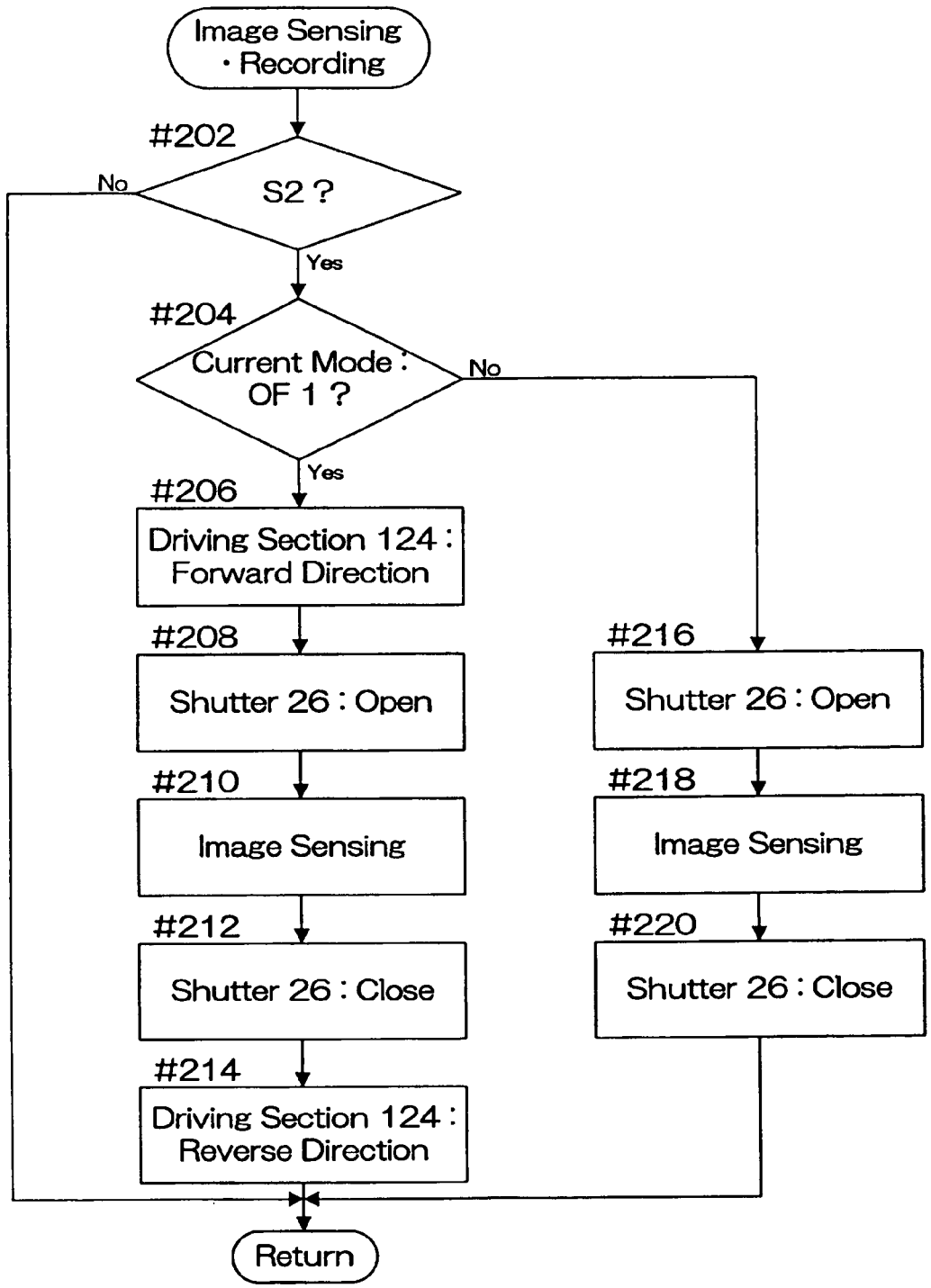
FIG. 9 is a flow chart showing the processing flow of the operation control during photographic image recording in the digital camera of FIG. 1.

FIG. 9 shows the flow of the control process focusing on the actuation of the quick return mirror M1 when recording a photographed image. First, a check is made to determine whether or not a signal S2 specifying recording has been generated by operation of the shutter release button 9 (#202). When a signal S2 has not been generated, the process ends. When a signal S2 has been generated, a determination is made as to whether or not the photographic mode at that moment is set at the optical finder mode 1 (#204).

When the mode is set at the optical finder mode 1, power is supplied to the drive unit 124 in the forward direction, the quick return mirror M1 is rotated to the retracted position (#206), the focal plane shutter 26 is opened, and light is directed to the CCD 302 (#208). Then, image processing is started, including photoelectric conversion by the CCD 302 (#210). At the moment a predetermined time corresponding to the shutter speed has elapsed, the shutter 26 is closed (#212), power is supplied to the drive unit 124 in the reverse direction, and the quick return mirror M1 is returned to the advanced position (#214).

The processes of steps #212 and #214 are executed in parallel, and processing of the image signals output by the CCD 302 and the recording image generation process are executed, and the generated image is recorded in the memory card 8, whereupon the process ends. When the CCD unit 303 is set at the back side at the moment the signal S2 is generated, a process to supply power to the drive unit 306 in the reverse direction and move the CCD unit 303 to the front side is executed simultaneously with the retraction of the mirror M1 in #206.

When the optical finder mode 1 is not set, i.e., when optical finder mode 2 or the liquid crystal finder mode is set, a process to open the shutter 26 (#216), photographic process (#218), and process to close the shutter 26 (#220) are sequentially executed, and actuation of the quick return mirror M1 is omitted. These modes are photographic mode wherein the mirror M1 is normally held at the retracted position or the advanced position, since the mirror M1 has been set at the retracted position or the advanced position beforehand.

The position of the CCD unit 303 is set beforehand to match the position of the mirror M1 by the controls during mode switching shown in FIG. 8.

Figure 10:
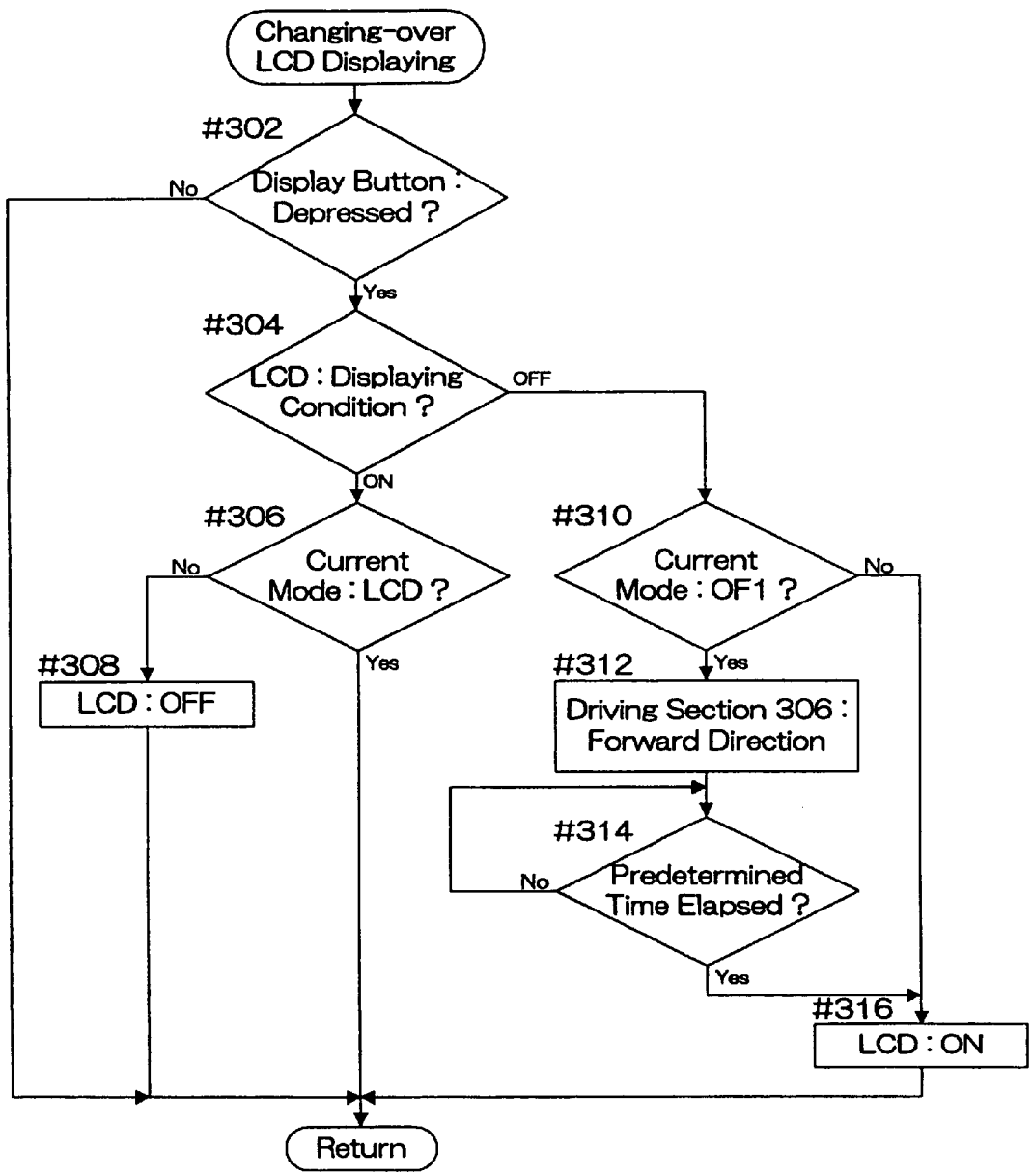
FIG. 10 is a flow chart showing the processing flow of the LCD ON/OFF control in the digital camera of FIG. 1.

FIG. 10 shows the flow of the control process relating to ON/OFF switching of the LCD 212. First, it is determined whether or not the display button 213 has been operated (#302). If the button 213 has not been operated, the process ends without action. If the button 213 has been operated, a check is made to determine whether or not the LCD 212 is ON at that moment (#304).

When the LCD 212 is ON, a check is made to determine whether or not the photographic mode is set at the liquid crystal finder mode (LCD) (#306). If the photographic mode is not the liquid crystal finder mode, i.e., when either the optical finder mode 1 or 2 is set, the LCD 212 is turned OFF by stopping the power supplied thereto (#308), and the process ends. If the liquid crystal finder mode is set, the process ends without action. In this way, in the liquid crystal finder mode, the operation of the display button 213 is invalid, and the LCD 212 is forcibly kept ON.

When it is determined in step #304 that the LCD 212 is OFF, a check is made to determine whether or not the photographic mode is set at the optical finder mode 1 (#310). When the optical finder mode 1 is set, power is supplied to the drive unit 306 in the forward direction, and the CCD unit 303 is moved to the back side (#312), the elapse of the specific time required for this movement is awaited (#314), the LCD 212 is turned ON (#316), and the process ends. The display of an unfocused finder image is avoided by waiting for the end of the movement of the CCD unit 303. When the optical finder mode 1 is not set, the LCD 212 is directly turned ON (#316), and the process ends. Since the LCD 212 is turned ON when the mode is set in the liquid crystal finder mode, the process does not advance from steps #304 to #310.

Figure 11:
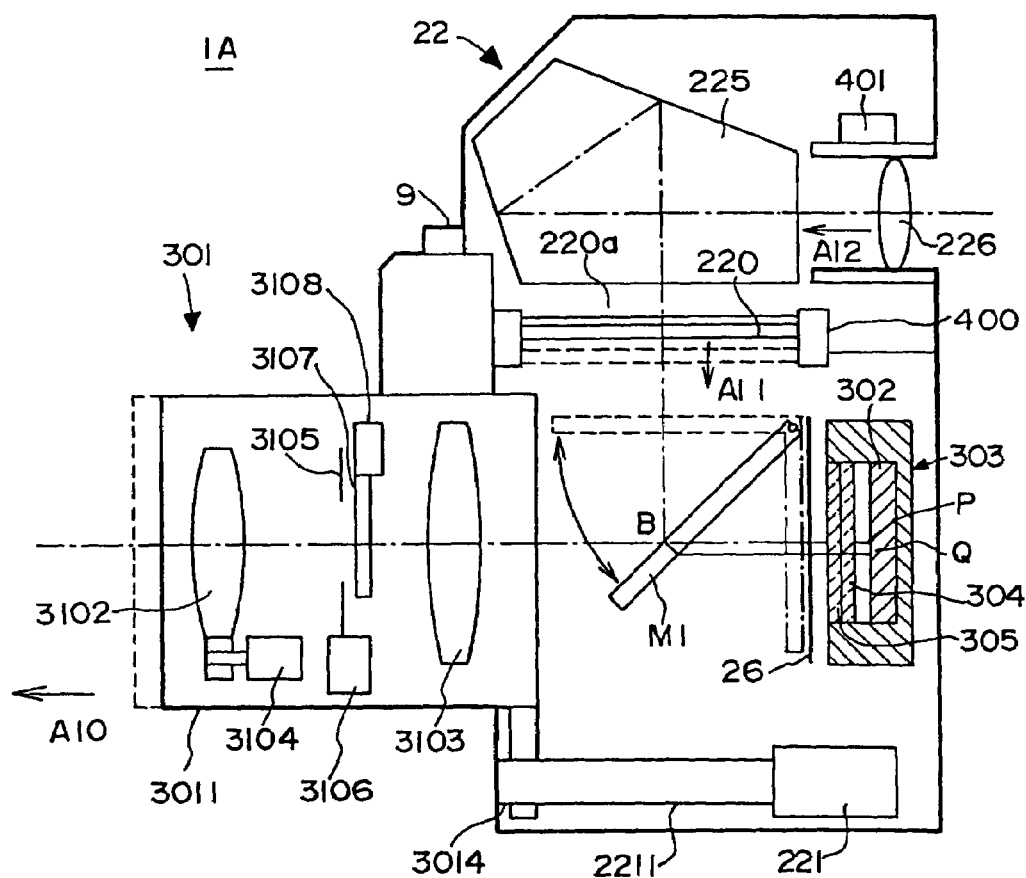
FIG. 11 is a sectional view of a digital camera of a second embodiment of the present invention.

FIG. 11 is a cross section view of the digital camera 1A of a second embodiment viewed from the side. The majority of the construction of the digital camera 1A is identical to the digital camera 1 of the first embodiment, and structural elements having identical or similar functions are designated by the same reference numbers; duplicate description is omitted and only the aspects of difference are described below. The digital camera 1A has the exterior view shown in FIGS. 1 and 3, and an LCD 212 is provided on the back of the camera body 2.

In the digital camera 1A, the difference in the optical path length from the taking lens 301 to the CCD 302 when the semitransparent quick return mirror M1 is set at the advanced position indicated by the solid line in FIG. 11 and when set at the retracted position indicated by the dashed line is corrected by displacement of the taking lens 301 along the optical axis. Specifically, when the quick return mirror M1 is held at the advanced position for photography, the taking lens 301 is displaced to the front side (arrow A10) more than when the mirror M1 is rotated to the retracted position for photography. The displacement of the taking lens 301 is executed with the same timing as the displacement of the CCD unit 303 in the digital camera 1 of the first embodiment. In the digital camera 1A, the CCD unit 303 is fixed within the camera body 2, and the previously described displacement mechanism including the drive unit 306 is not provided.

Although the difference in the optical path lengths is corrected by displacement of the taking lens 301 along the optical axis of the lens 301, when the mirror M1 is set at the advanced position the image forming position of the light on the CCD 302 is shifted below the image forming position when the mirror M1 is set at the retracted position. In the digital camera 1A, the shifting of the center of the photographed image from the optical axis of the taking lens 301 caused by this shift of the image forming position is prevented by changing the processing of the image signal output from the CCD 302 in accordance with the position of the mirror M1.

Figure 12:
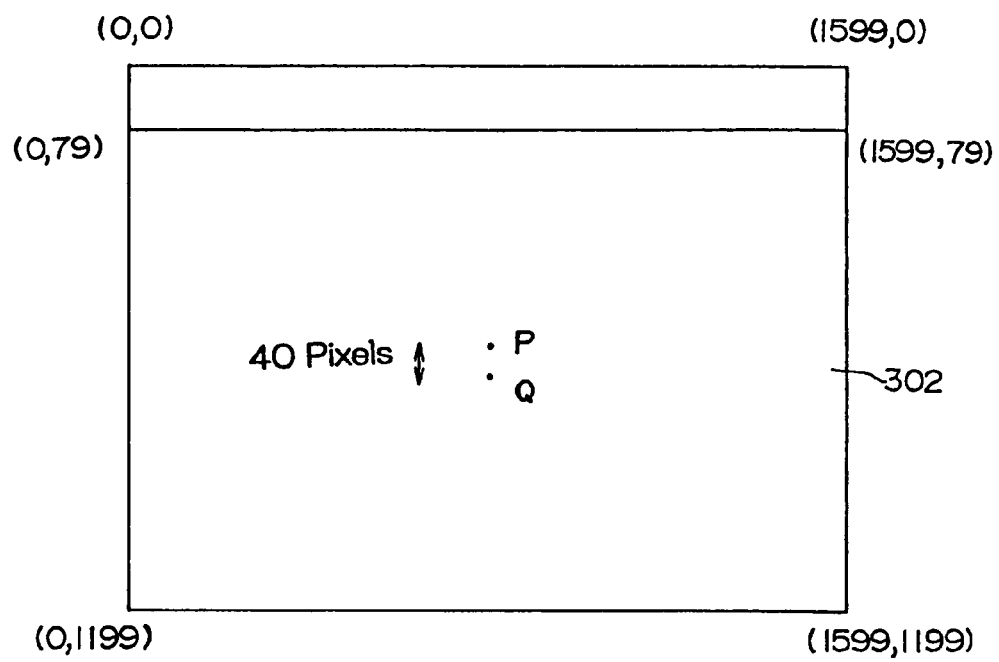
FIG. 12 shows an example of the CCD pixel setting of the digital camera of FIG. 11, and an example of the usage range of the pixels of the CCD in accordance with the position of the quick return mirror.

The CCD 302 comprises 1600×1200 (horizontal×vertical) pixels; image signal processing is described using as an example the situation wherein the image forming position of the light flux at which the principal ray matches the optical axis of the taking lens 301 is shifted 40 pixels downward when the mirror M1 is set at the advanced position. The CCD 392 is shown schematically in FIG. 12. The positions on the CCD 302 are represented by (m,n) (where m=0~1599, and n=0~1199) with (0,0) as the origin in the upper left corner. In FIG. 12, the point P and point Q are the image forming positions of the light flux at which the principal ray matches the optical axis of the taking lens 301 when the mirror M1 is set at the retracted position and the advanced position, respectively.

In the digital camera 1A, when the mirror M1 is set art the retracted position, pixel data are generated by processing the image signals output from all pixels within the range of (0,0)~(1599~1199), i.e., all pixels of the CCD 302, and these pixel data are designated the finder image displayed on the LCD 212, and the image recorded on the memory card 8. On the other hand, when the mirror M1 is set at the advanced position, the pixels within the range (0,0)~(1599,79), i.e., pixels of the top 80 lines of the CCD 302, are not processed, and the only the image signals output from the remaining pixels within the range of (0,80)~(1599,1199) are processed and designated the finder image and the recording image.

According to this process, the optical axis of the taking lens 301 normally passes through the center of the photographed image regardless of whether the mirror M1 is set at the retracted position or the advanced position. Furthermore, when the mirror M1 is set at the advanced position, the light from the taking lens 301 does not enter part of the range (0,0)~(1599,79) so as to generate eclipse of the image on the CCD 302, but this area of eclipse is eliminated by the aforesaid process.

Alternatively, image signals output from all pixels of the CCD 302 may be processed to generate pixel data, and only part of the generated pixel data read from the image memory 209 and used for display on the LCD 212 and recorded to the memory card 8.

In the digital camera 1A wherein the position of the taking lens 301 changes when the quick return mirror M1 is set at the advanced position and set at the retracted position, the optical path length from the taking lens 301 to the screen 220 is not fixed, and the situation arises wherein the image on the screen 220, i.e., the optical finder image, may not be focused although the image on the CCD 302, i.e., the photographed image, is focused.

In the digital camera 1A, in order to match the optical path lengths when photographing with the mirror M1 set at the advanced position, when the taking lens 301 is displaced to the front, the screen 220 is displaced downward (arrow A11 in FIG. 11), and the eyepiece lens 226 is displaced foreword (arrow A12). The amount of displacement of the screen 220 and the eyepiece lens 226 is identical to the amount of displacement of the taking lens 301. The optical finder 22 is provided with a drive unit 400 for displacing the screen 220, and a drive unit 401 for displacing the eyepiece lens 226.

These drive units 400 and 401 are of the self supporting type and have constructions identical to the drive unit 306 of the CCD unit displacement mechanism 307 of the digital camera 1 of the first embodiment, Accordingly, electrical power is not required to maintain the screen 220 at the position before displacement represented by the solid line, or the position after displacement indicated by the dashed line, and electrical power is unnecessary even to maintain the position of the eyepiece lens 226.

According to this construction and controls, the optical finder 22 and the LCD 212 also may be used simultaneously in the digital camera 1A. According to this image process, the photographic range when the mirror M1 is set at the advanced position becomes narrower in the vertical direction than the photographic range when photographing with the mirror M1 rotated to the retracted position. When setting the composition using the optical finder 22, the finder image provided by the optical finder 22 includes the photographic frame representing the photographic range since the photographic range is well defined.

Figure 13:
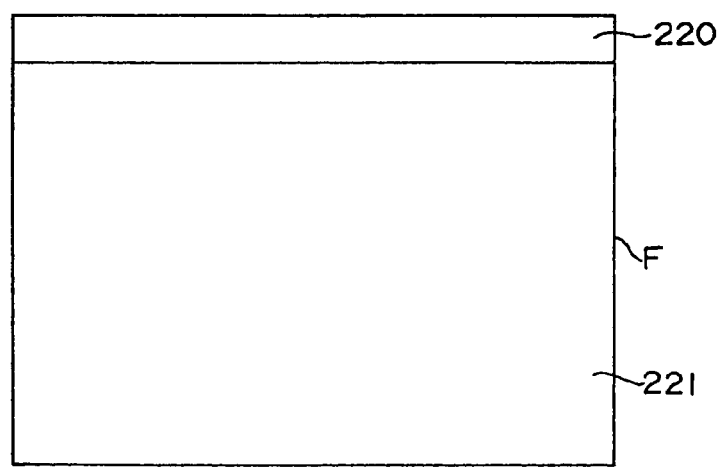
FIG. 13 shows an example of the positional relationship of the screen and the photographic frame displayed in the optical finder when the quick return mirror is set at the advanced position in the digital camera of FIG. 11.

FIG. 13 shows a photographic frame F when the mirror M1 is set at the advanced position. The user can know the part within the photographic frame F that is the actual photographic range in the image formed on the entire screen 220. The display of the photographic frame F is accomplished by a transparent type LCD 220a provided closely on the top surface of the screen 220, as shown in FIG. 11. Although the photographic frame may be displayed even when the mirror M1 is rotated to the retracted position for photography, this is unnecessary since the entire screen 220 corresponds to the entire photoreception range of the CCD 302.

Figure 14:
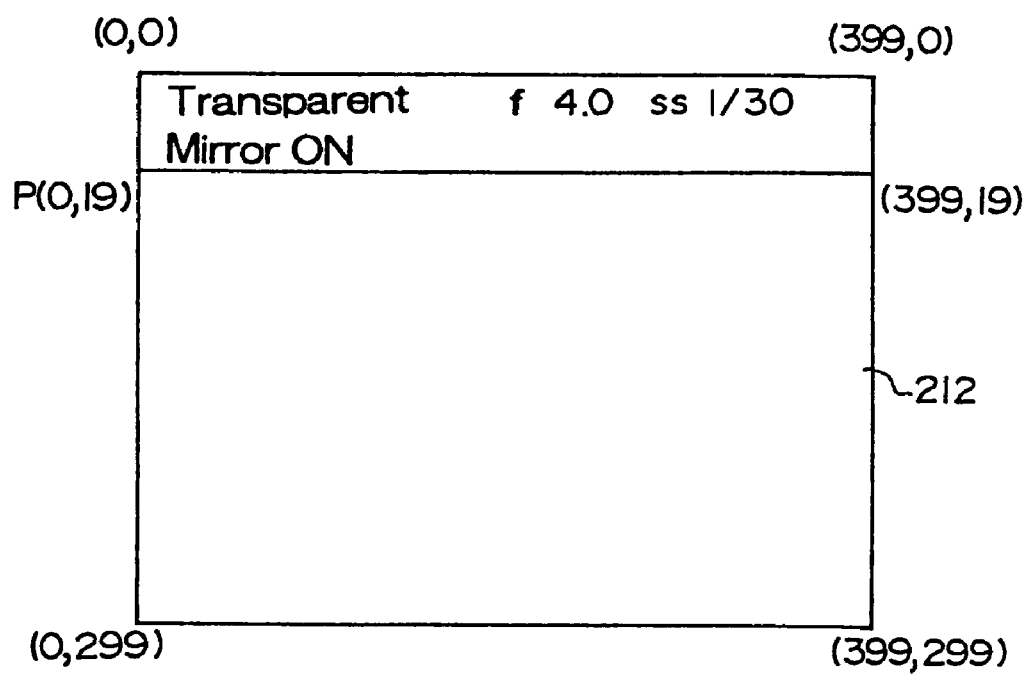
FIG. 14 shows an example of the LCD display when the quick return mirror is set at the advanced position in the digital camera of FIG. 11.

When the image photographed with the mirror M1 set at the advanced position is displayed on the LCD 212, blank area is produced in part of the LCD 212. With reference to FIG. 14, the display of the LCD 212 is described below using as an example the situation wherein the LCD 212 comprises 400×300 (horizontal×vertical) pixels and the previously described settings of the CCD 302. The positions on the LCD 212 are represented by (j,k) (where j=0~399, and k=0~299) with (0,0) as the origin in the upper left corner.

The photographed image is displayed, for example, in the range (0,20)~(399,299). At this time, since the range (0,0)~(399,19) is blank, a message such as [semitransparent mirror ON] is displayed to alert the user that the quick return mirror M1 is set at the advanced position. In this way the photographer avoids confusion caused by the change in the photographic range by effectively using the area unused by the photographed image. This message also may include camera settings directly related to photography such as stop and shutter speed set values (Av, Tv) and the like, as well as other information, e.g., date/time, remaining battery power, remaining capacity of the memory card 8 and the like.

In the digital cameras 1 and 1A of the previously described embodiments, the change in the optical path from the taking lens 301 to the CCD 302 is corrected by changing the position of the CCD 302 or the taking lens 301 depending on whether or not the semitransparent mirror M1 is on the optical path, such that the optical path length from the taking lens 301 to the CCD 302, or this optical path length and the impingement of the light on the CCD 302 are normally fixed.

This control is not limited to a semitransparent mirror, and may be applied to all optical elements. For example, any element among the spatial low pass filter 304 integratedly formed with the CCD 302, infrared cutting filter 305, and ND filter 3107 disposed within the taking lens 301 may be arranged on the optical path from the taking lens 301 to the CCD 302, and the difference in the optical path when the optical element is set at a position on the optical path and when the optical element is retracted from the optical path can be corrected in accordance with the previously described control.

This control may be applied not only when changing the position of an optical element by rotation, but also when changing via movement without rotation. The control also may be used when the optical element perpendicularly intersects the optical path.

In the aforesaid digital cameras having a semitransparent mirror as a quick return mirror, the display unit normally may be used as a finder, and the optical finder may be used by setting the semitransparent mirror to the retracted position. Furthermore, since all the light from the taking lens is directed to the image sensing element by setting the semitransparent mirror to the retracted position, it is possible to photograph a bright image even in a dark environment, and the shutter speed, i.e. Tv can be increased in a bright environment.

In a construction wherein the difference in the optical path depending on the position of the semitransparent mirror can be eliminated by changing the position of the image sensing element to correspond to the position of the semitransparent mirror such that the light entering the image sensing element is equalized when the semitransparent mirror is set at the advanced position and set at the retracted position, there is increased freedom in selecting the position of the semitransparent mirror and greater diversification in the use of the finder.

Similar effectiveness can be obtained in a construction wherein the optical path length from the taking lens to the image sensing element is equalized when the semitransparent mirror is set at the advanced position and set at the retracted position by changing the position of the taking lens in correspondence with the position of the semitransparent mirror. Since the screen and eyepiece lens of the optical finder are changed in accordance with the position of the taking lens, the optical finder image normally represents correctly the image forming state of the photographed image. The region of the image sensing element used for photography or the region of the photographed image used for display change in accordance with the position of the semitransparent mirror, so as to prevent shifting of the recording image and the display image.

In a digital camera having a photographic mode wherein the semitransparent mirror is retracted for photography to record an image and a photographic mode wherein semitransparent mirror normally remains at the advanced position, a bright image is obtained using the former photographic mode, and an image unaffected by vibration due to the rotation of the semitransparent mirror is obtained in the latter photographic mode.

In a digital camera using a semitransparent mirror as a quick return mirror and having a photographic mode wherein the semitransparent mirror is set at the retracted position only when photographing an image for recording and a photographic mode wherein semitransparent mirror normally remains at the advanced position, characteristics of an optical finder and characteristics of a display unit as a finder are both attained in the former photographic mode. For example, an unblurred image can be observed using the optical finder even when the object is moving rapidly, and the image displayed on the display unit can be used for confirmation when the user desires to know the true color balance of the image to be recorded. In the latter photographic mode, an image completely unaffected vibration due to rotation of the semitransparent mirror can be photographed using the characteristics of the display unit.

In this digital camera, difference in the optical path length caused by the position of the semitransparent mirror can be eliminated by changing the position of the image sensing element or the taking lens in accordance with the position of the semitransparent mirror, and there is increased freedom in selecting the position of the semitransparent mirror and greater diversification in the use of the finder.

In the digital camera wherein the optical path length from the taking lens to the image sensing element is rendered fixed regardless of the position of optical element by arranging a retractable optical element at an inclination in the optical path from the taking lens to the image sensing element, and changing the position of the taking lens in conjunction with the position of the optical element, a specific optical element can be advanced onto the optical path as necessary, and the image formation state on the image sensing element does not change whether this optical element is set at the advanced position or the retracted position. Accordingly, the focus of the photographed image is unaffected, and the conventional function of the optical element is usable.

Similar effectiveness can be obtained in a digital camera wherein the light impinging the image sensing element is rendered fixed regardless of the position of the optical element by arranging a retractable optical element on the optical path from the taking lens to the image sensing element, and changing the position of the image sensing element in accordance with the position of the optical element.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. A digital camera comprising:
   an image sensor disposed at a position at which an image is to be formed by a taking lens;
   a recorder for recording on a recording medium an image sensed by said image sensor in accordance with recording instructions;
   a semitransparent mirror which rotates about an axis in a direction perpendicular to the optical axis of the taking lens so as to move between an advanced position intersecting at an inclination an optical path from the taking lens to the image sensor for photographing in a first photographic mode where a first portion of the light transmitted by the taking lens is reflected by the semitransparent mirror and a second portion of the light transmitted by the taking lens forms an image on the image sensor, and a retracted position removed from the optical path for photographing in a second photographic mode where substantially all of the light transmitted by the taking lens forms an image on the image sensor; and
   an optical finder providing an image by directing the light reflected by said semitransparent mirror set at the advanced position from the taking lens to the eye of a user.

2. A digital camera according to claim 1, wherein said semitransparent mirror is a quick return mirror.

3. A digital camera according to claim 1, wherein said image sensor is movable between a first position and a second position, and said image sensor is positioned in the first position when said semitransparent mirror is in the retracted position and positioned in the second position when said semitransparent mirror is in the advanced position, wherein the second position with said semitransparent mirror intersecting the optical path and the first position without said mirror are optically equivalent with each other.

4. A digital camera according to claim 3, wherein the first position and the second position are set so as to equalize the optical path length from the taking lens directly to said image sensor when said semitransparent mirror is set at the retracted position, and the optical path length from the taking lens through said semitransparent mirror to said image sensor when said semitransparent mirror is set at the advanced position.

5. A digital camera according to claim 3, wherein the first position and the second position are set so as to equalize the imaging position of an image formed by the taking lens directly on said image sensor when said semitransparent mirror is set at the retracted position, and the imaging position of an image formed by the taking lens through said semitransparent mirror on said image sensor when said semitransparent mirror is set at the advanced position.

6. A digital camera according to claim 1 further comprising a driver for moving the taking lens between a first position and a second position in a direction along the optical path, the first position and the second position are set so as to equalize the optical path length from the first position directly to said image sensor when said semitransparent mirror is set at the retracted position, and the optical path length from the second position through said semitransparent mirror to said image sensor when said semitransparent mirror is set at the advanced position.

7. A digital camera according to claim 1, wherein said digital camera is controllable under a first photographic mode wherein said semitransparent mirror is set at the advanced position until recording is instructed, and set at the retracted position when recording has been instructed, and returns to the advanced position again when said image sensor completes the sensing of the image, and a second photographic mode wherein said semitransparent mirror is set at the advanced position regardless of whether or not the recording is instructed.

8. A digital camera according to claim 1 further comprising a display for displaying an image sensed by said image sensor.

9. A digital camera according to claim 8, wherein said digital camera is controllable under a first photographic mode wherein said semitransparent mirror is set at the advanced position until recording is instructed, and set at the retracted position when recording has been instructed, and a second photographic mode wherein said semitransparent mirror is set at the retracted position regardless of whether or not the recording is instructed.

10. A digital camera comprising:
    an image sensor disposed at a position at which an image is to be formed by a taking lens; and
    an optical element movable between an advanced position intersecting at an inclination an optical path from the taking lens to said image sensor, and a retracted position removed from the optical path,
    wherein said digital camera is controllable under a first photographic mode wherein said optical element is set at the advanced position for photography, said image sensor receiving said image through the semitransparent mirror in said advanced position, and a second photographic mode wherein said optical element is set at the retracted position for photography, said image sensor receiving said image from said taking lens in the retracted position, and the optical path lengths from the taking lens to said image sensor are equalized in the first photographic mode and the second photographic mode by moving the taking lens in a direction along the optical axis of the taking lens.

11. A digital camera according to claim 10, wherein said optical element is at least a single element for photography.

12. A digital camera according to claim 11, wherein said optical element is at least one of semitransparent mirror, infrared cutting filter, spatial modulation element and ND filter.

13. A digital camera according to claim 10, wherein said optical element is moved between the advanced position and the retracted position by rotation.

14. A digital camera according to claim 10, wherein said optical element is moved between the advanced position and the retracted position by a movement other than rotation.

15. A digital camera according to claim 10, wherein said image sensor is movable between a first position and a second position, and said image sensor is positioned in the first position when said optical element is in the retracted position and positioned in the second position when said optical element is in the advanced position,
wherein the second position with said optical element intersecting the optical path and the first position without said optical element are optically equivalent with each other.

16. A digital camera according to claim 15, wherein the first position and the second position are set so as to equalize the optical path length from the taking lens directly to said image sensor when said optical element is set at the retracted position, and the optical path length from the taking lens through said optical element to said image sensor when said optical element is set at the advanced position.

17. A digital camera according to claim 15, wherein the first position and the second position are set so as to equalize the imaging position of an image formed by the taking lens directly on said image sensor when said optical element is set at the retracted position, and the imaging position of an image formed by the taking lens through said optical element on said image sensor when said optical element is set at the advanced position.

18. A digital camera comprising:
an image sensor disposed at a position at which an image is to be formed by a taking lens;
a recorder for recording on a recording medium the image sensed by said image sensor in accordance with recording instructions;
a semitransparent mirror which rotates about an axis in a direction perpendicular to the optical axis of the taking lens so as to move between an advanced position intersecting at an inclination the optical path from the taking lens to the image sensor so that a first portion of the light transmitted by the taking lens is reflected by the semitransparent mirror and a second portion of the light transmitted by the taking lens forms an image on the image sensor, and a retracted position removed from the optical path so that substantially all of the light transmitted by the taking lens forms an image on the image sensor;
an optical finder providing an image by directing the light reflected by said semitransparent mirror at the advanced position from the taking lens to the eye of a user; and
a display portion which displays the image sensed by said image sensor, said display portion displaying the image which is formed at the image sensor with second portion of the light transmitted through the semitransparent mirror at the advanced position from the taking lens.

19. A digital camera according to claim 18, wherein said image sensor is movable between a first position and a second position, and said image sensor is positioned in the first position when said semitransparent mirror is in the retracted position and positioned in the second position when said semitransparent mirror is in the advanced position,
wherein the second position with said semitransparent mirror intersecting the optical path and the first position without said mirror are optically equivalent with each other.

20. A digital camera comprising:
an image sensor disposed at a position at which an image is to be formed by a taking lens; and
an optical element movable between an advanced position interposed at an inclination in an optical path from the taking lens to said image sensor, and a retracted position where the optical element is not interposed in the optical path from the taking lens to the image sensor,
wherein said digital camera is controllable under a first photographic mode wherein said optical element is set at the advanced position for photography, and a second photographic mode wherein said optical element is set at the retracted position for photography, and the optical path lengths from the taking lens to said image sensor are equalized in the first photographic mode and the second photographic mode by moving the image sensor.

* * * * *